United States Patent
Kajiwara

(10) Patent No.: US 9,545,880 B2
(45) Date of Patent: Jan. 17, 2017

(54) INFORMATION PROCESSING DEVICE, INFORMATION PROCESSING METHOD, AND NON-TRANSITORY COMPUTER-READABLE RECORDING MEDIUM FOR SHOWING AN INDICATION OF AN OBSTACLE

(71) Applicant: Yasuhiro Kajiwara, Kanagawa (JP)

(72) Inventor: Yasuhiro Kajiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 14/582,316

(22) Filed: Dec. 24, 2014

(65) Prior Publication Data

US 2015/0203036 A1 Jul. 23, 2015

(30) Foreign Application Priority Data

Jan. 17, 2014 (JP) .................................. 2014-006625

(51) Int. Cl.
    *B60R 1/00* (2006.01)
    *G02B 27/01* (2006.01)
    (Continued)

(52) U.S. Cl.
    CPC ............ *B60R 1/00* (2013.01); *G01C 21/3697* (2013.01); *G02B 27/01* (2013.01); *G02B 27/0101* (2013.01); *G06F 3/00* (2013.01); *G06F 3/013* (2013.01); *G06K 9/00791* (2013.01); *G06K 9/00805* (2013.01); *G08G 1/166* (2013.01); *B60R 2300/305* (2013.01);
(Continued)

(58) Field of Classification Search
    CPC ................. B60R 2300/8093; B60R 2300/305; B60R 2300/308; B60R 1/00; G06K 9/00791; G06K 9/0808; B60K 35/00; G02B 27/01; G08G 1/166
    See application file for complete search history.

(56) References Cited

U.S. PATENT DOCUMENTS 8,810,880 B2    8/2014    Hamano et al.
9,047,703 B2 *  6/2015    Beckwith ................ G06T 15/08
(Continued)

FOREIGN PATENT DOCUMENTS

JP           3999025         10/2007
JP         2010-049232     3/2010
(Continued)

*Primary Examiner* — Quan-Zhen Wang
*Assistant Examiner* — Xuemei Zheng
(74) *Attorney, Agent, or Firm* — IPUSA, PLLC

(57) ABSTRACT

An information processing device includes a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part, and a second calculation part configured to calculate a position of an end point of an indication line on the transparent screen, the indication line being viewed as extending from a position of the first icon on the transparent screen toward the obstacle.

10 Claims, 16 Drawing Sheets

(51) Int. Cl.
  *G06F 3/01*    (2006.01)
  *G06K 9/00*    (2006.01)
  *G06F 3/00*    (2006.01)
  *G01C 21/36*   (2006.01)
  *G08G 1/16*    (2006.01)

(52) U.S. Cl.
  CPC . *B60R 2300/308* (2013.01); *B60R 2300/8093* (2013.01); *G02B 2027/014* (2013.01); *G02B 2027/0138* (2013.01)

(56) References Cited

U.S. PATENT DOCUMENTS

| | | | |
|---|---|---|---|
| 9,061,632 B2* | 6/2015 | Toyofuku | B60R 1/00 |
| 2011/0199198 A1* | 8/2011 | Yang | B60K 35/00 |
| | | | 340/426.25 |
| 2012/0320207 A1* | 12/2012 | Toyofuku | B60R 1/00 |
| | | | 348/148 |
| 2014/0267263 A1* | 9/2014 | Beckwith | G06T 15/08 |
| | | | 345/424 |
| 2016/0003636 A1* | 1/2016 | Ng-Thow-Hing | G01C 21/3608 |
| | | | 701/26 |

FOREIGN PATENT DOCUMENTS

| | | |
|---|---|---|
| JP | 2012-244260 | 12/2012 |
| JP | 2013-196359 | 9/2013 |

* cited by examiner

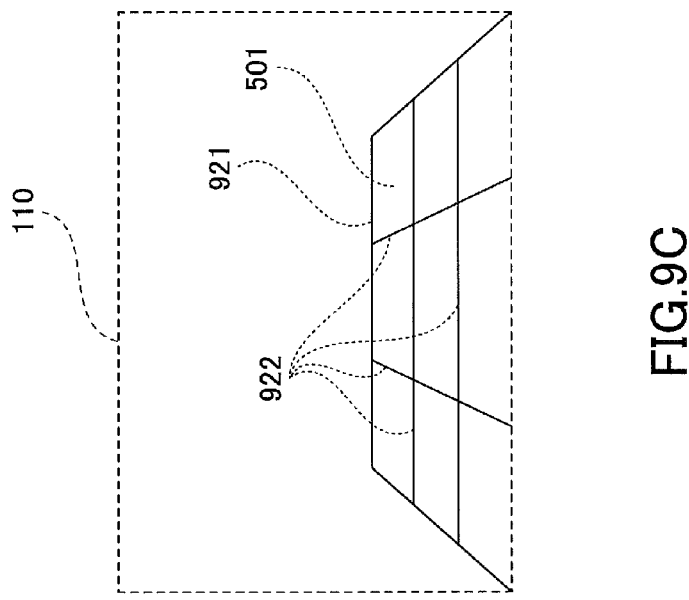
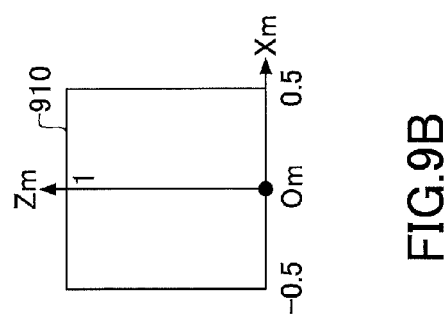
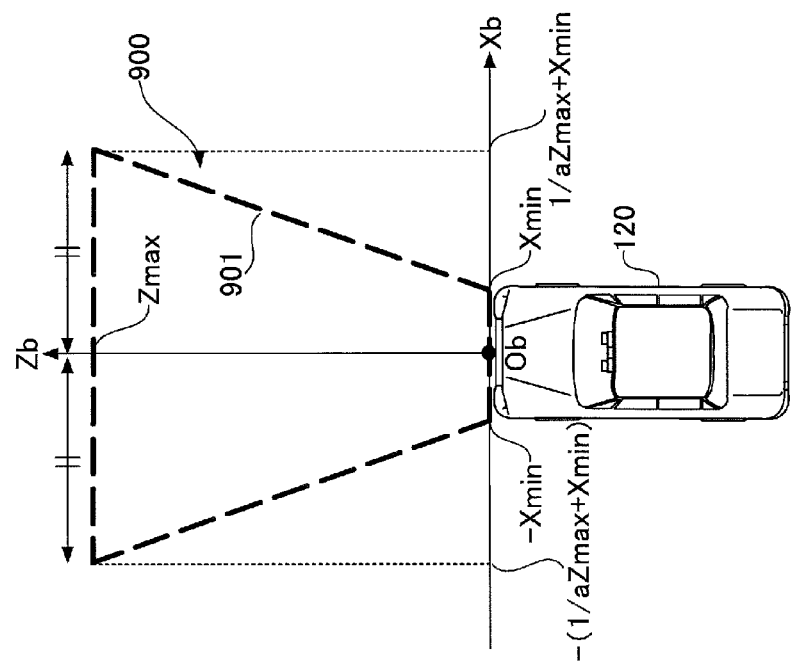
FIG.9C
FIG.9B
FIG.9A

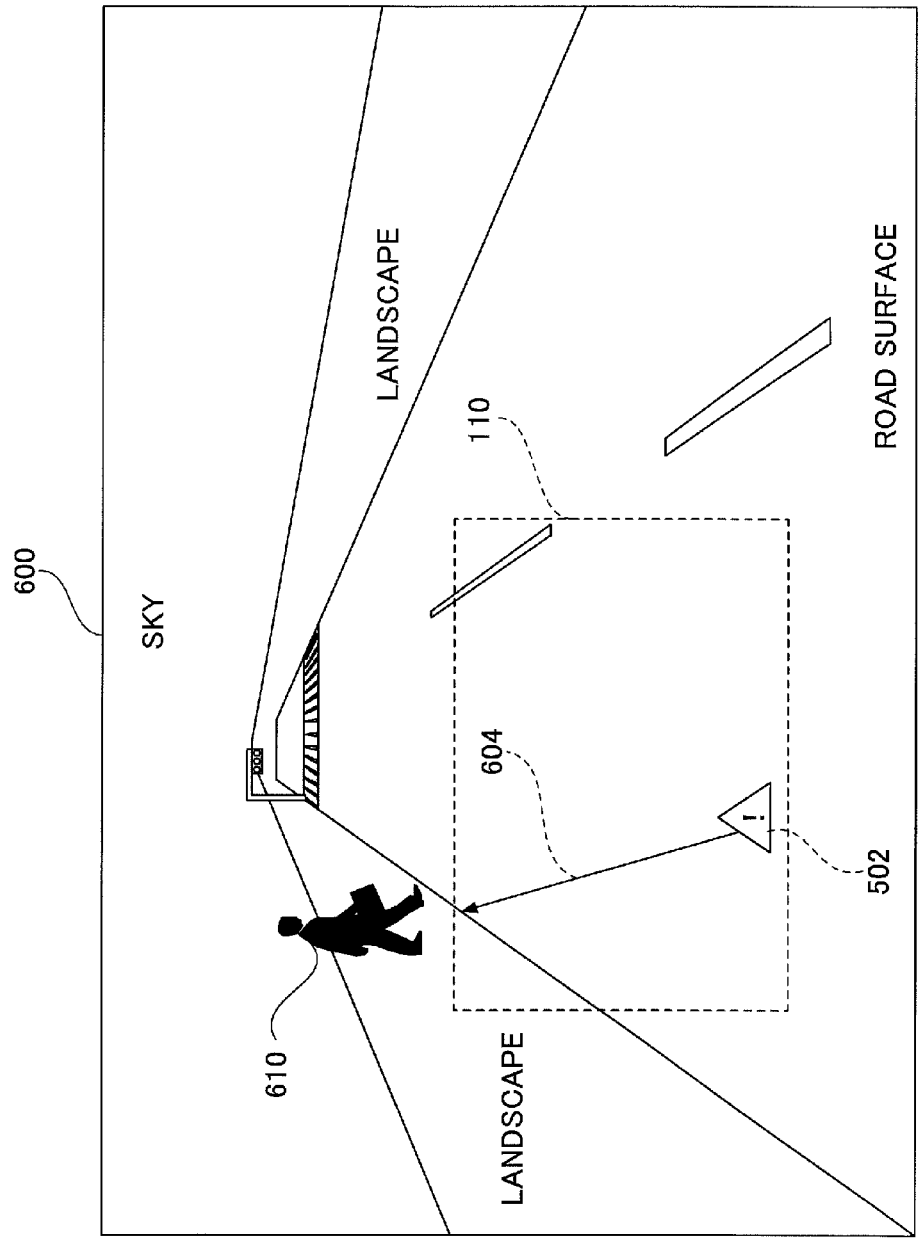

INFORMATION PROCESSING DEVICE, INFORMATION PROCESSING METHOD, AND NON-TRANSITORY COMPUTER-READABLE RECORDING MEDIUM FOR SHOWING AN INDICATION OF AN OBSTACLE

BACKGROUND OF THE INVENTION

1. Field of the Invention

An aspect of the present invention relates to at least one of an information processing device, an information processing method, and a non-transitory computer-readable recording medium.

2. Description of the Related Art

Conventionally, a head-up display device has been known as a device for assisting obstacle avoidance behavior of a driver during an operation of a vehicle.

A head-up display device is a device for presenting a transparent screen at a front position of a driver and displaying a variety of images thereon. According to such a device, an image for emphasizing an obstacle that is an attention calling object is arranged at a position on a transparent screen that corresponds to a position of an eye ball of a driver so that it is possible to superimpose and display such an image on the attention calling object. Hence, it is possible for a driver to perceive the attention calling object with a little of movement of a line of sight (see, for example, Japanese Patent Application Publication No. 2013-196359).

However, in a case of a conventional head-up display device that includes Japanese Patent Application Publication No. 2013-196359, an area where it is possible to superimpose and display an image for emphasizing an attention calling object on the attention calling object depends on a size of a transparent screen. Hence, in a case where a size of a transparent screen is small, it is merely possible to execute displaying of an emphasizing image for only an attention calling object present in a limited area.

Furthermore, it is necessary to execute display that is readily perceived by a driver even when a small size is provided, in order to enable a driver to perceive an attention calling object and take avoidance behavior by a display in a limited area.

Thus, it is desired that display on a head-up display device is executed in such a manner that it is possible for a driver to take a sufficient avoidance behavior regardless of whether or not an obstacle that is an attention calling object is present in an area of a transparent screen.

SUMMARY OF THE INVENTION

According to one aspect of the present invention, there is provided an information processing device, including a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part, and a second calculation part configured to calculate a position of an end point of an indication line on the transparent screen, the indication line being viewed as extending from a position of the first icon on the transparent screen toward the obstacle.

According to another aspect of the present invention, there is provided an information processing method, including a first calculation step configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part, and a second calculation step configured to calculate a position of an end point of an indication line on the transparent screen, the indication line being viewed as extending from a position of the first icon on the transparent screen toward the obstacle.

According to another aspect of the present invention, there is provided a non-transitory computer-readable recording medium storing therein a program configured to cause a computer to execute a first calculation step configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part, and a second calculation step configured to calculate a position of an end point of an indication line on the transparent screen, the indication line being viewed as extending from a position of the first icon on the transparent screen toward the obstacle.

BRIEF DESCRIPTION OF THE DRAWINGS

FIG. 9A, FIG. 9B, and FIG. 9C are diagrams for illustrating a method for production of an obstacle map and a coordinate plane image.

FIG. 16 is a diagram that illustrates an example of display of an alert image on a transparent screen.

DETAILED DESCRIPTION OF THE PREFERRED EMBODIMENTS

Figure 1:
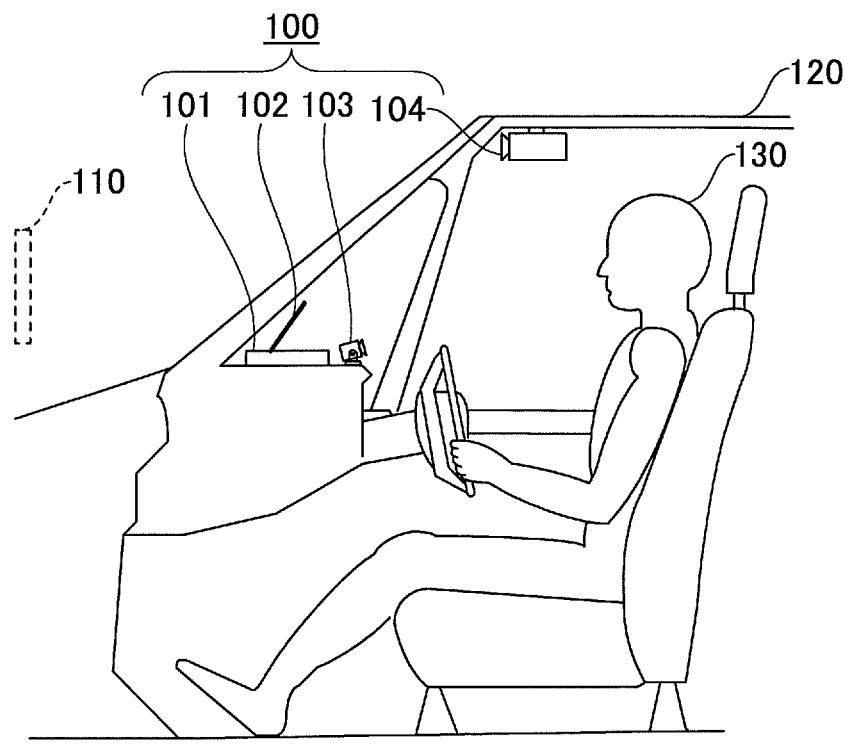
FIG. 1 is a diagram that illustrates an example of arrangement of each part of an information processing system that includes an information processing device (head-up display device) according to an embodiment.

An embodiment of the present invention will be described below, with reference to the accompanying drawings. Here, an identical reference numeral or letter will be attached to a component that has a substantially identical functional configuration, in the present specification and the drawings, and thereby, a redundant description will be omitted.

A First Embodiment

1. A General Structure of an Information Processing System

First, arrangement of each part of an information processing system 100 that includes an information processing device (head-up display device) according to the present embodiment in a vehicle will be described. FIG. 1 is a diagram that illustrates an example of arrangement of each part of the information processing system 100 that includes an information processing device (head-up display device 101) according to the present embodiment in a vehicle 120.

As illustrated in FIG. 1, the information processing system 100 has a head-up display device 101, a transparent mirror 102, an eye ball position measurement part 103, and an obstacle sensing part 104.

The head-up display device 101 is arranged on a dash board in the vehicle 120 and presents a transparent screen 110 at a predetermined position that is in front of a driver 130 and occupies a part of a field of view of the driver 130.

The transparent mirror 102 is arranged inside a windshield of the vehicle 120 and an image (an alert image as described below) outputted from the head-up display device 101 is displayed on the transparent screen 110.

The eye ball position measurement part 103 is arranged on a dash board in the vehicle 120, measures a three-dimensional position of an eye ball of the driver 130, and outputs a measurement result to the head-up display device 101.

The obstacle sensing part 104 is arranged on a ceiling part in the vehicle 120 and detects an obstacle in front of the vehicle 120 through a windshield. Here, a stereo camera is used as the obstacle sensing part 104 in the present embodiment.

<A Method for Display on a Transparent Screen by a Head-Up Display Device>

Figure 2:
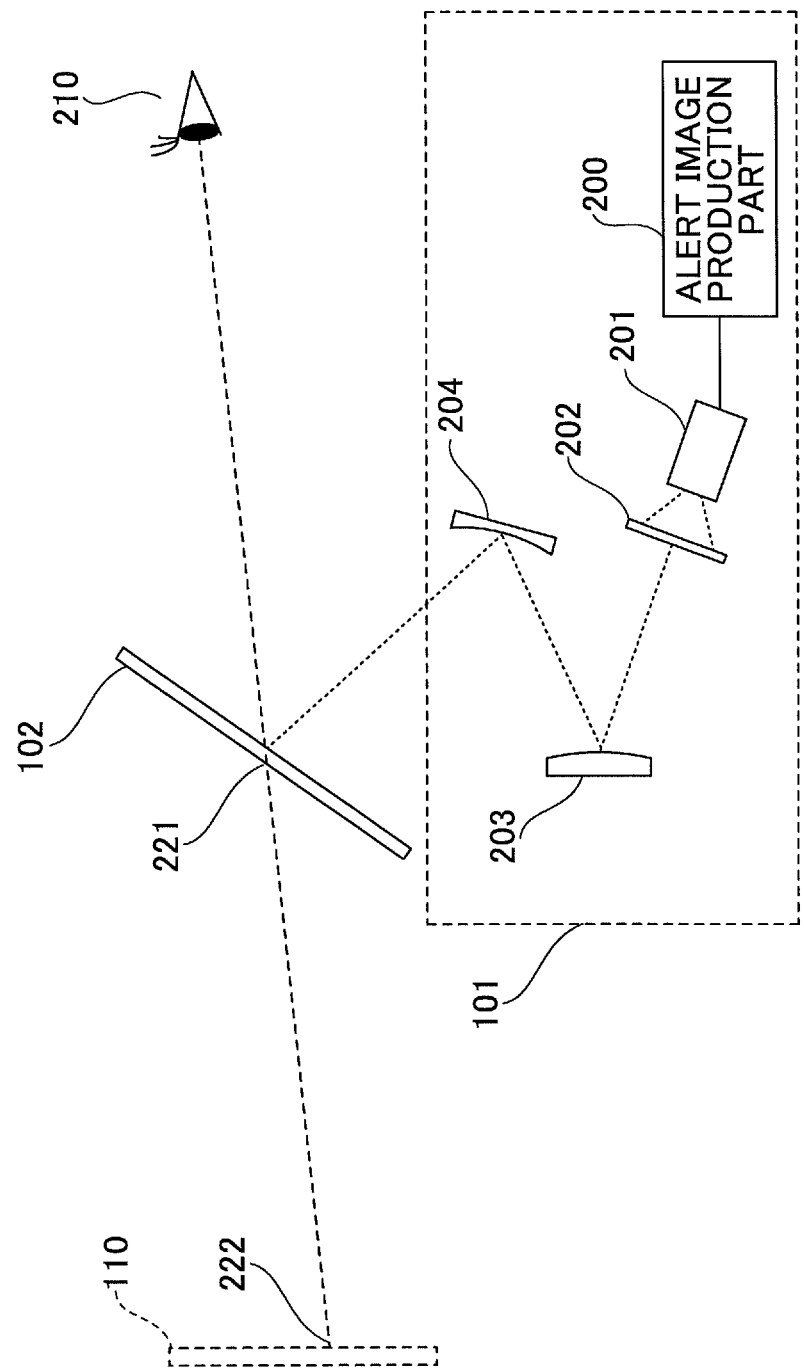
FIG. 2 is a diagram for illustrating a method for display of an image on a transparent screen in a head-up display device.

Next, a method for display on the transparent screen 110 in the head-up display device 101 will be described. FIG. 2 is a diagram for illustrating a method for display on the transparent screen 110 in the head-up display device 101.

As illustrated in FIG. 2, the head-up display device 101 has an alert image production part 200, an optical scanning device 201, a projection plane 202, a convex mirror 203, and a concave mirror 204. An image such as an alert image (wherein a detail thereof will be described below) is produced in the alert image production part 200 and inputted into the optical scanning device 201. The optical scanning device 201 outputs red, blue, and green light and projects an image onto the projection plane 202. An image projected by the projection plane 202 is reflected from the convex mirror 203, the concave mirror 204, and the transparent mirror 102, and an enlarged one on the transparent screen 110 is viewed by a driver.

That is, an image reflected from the transparent mirror 102 at coordinates 221 thereof appears at a viewpoint of a driver (a position of an eye ball 210) to be displayed on the transparent screen 110 at coordinates 222 thereof.

Figure 3:
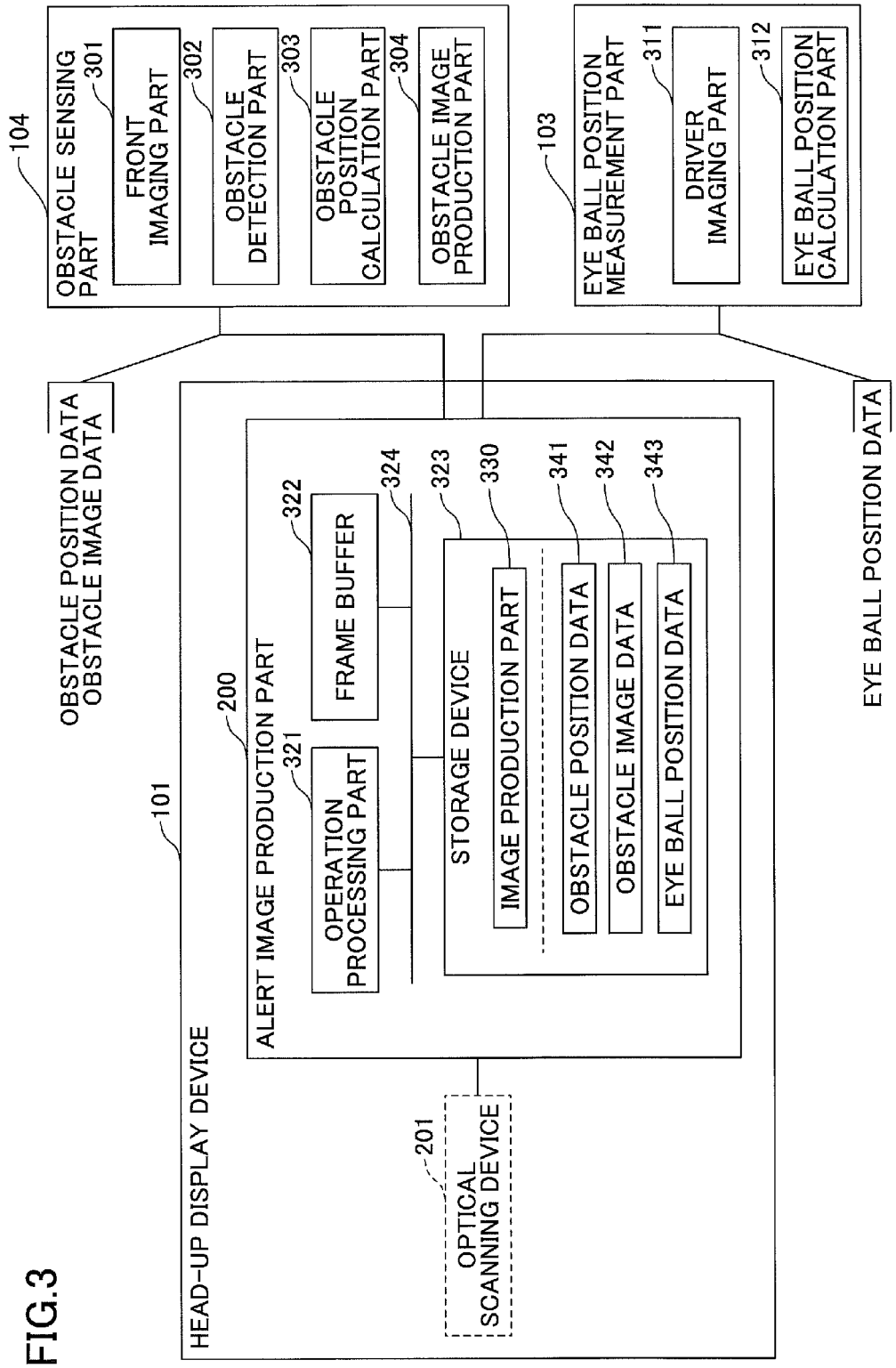
FIG. 3 is a diagram that illustrates a functional configuration of each part of an information processing system.

3. A Functional Configuration of Each Part that Composes an Information Processing System Next, a functional configuration of each part that composes the information processing system 100 will be described. FIG. 3 is a diagram that illustrates a functional configuration for a function associated with production of an alert image among functions of respective parts that compose the information processing system 100.

As illustrated in FIG. 3, the obstacle sensing part 104 has a front imaging part 301, an obstacle detection part 302, an obstacle position calculation part 303, and an obstacle image production part 304.

The front imaging part 301 is composed of a stereo camera, and an image of a front landscape for the vehicle 120 that is imaged by the front imaging part 301 is inputted into the obstacle detection part 302.

The obstacle detection part 302 detects an obstacle from an image that is inputted by the front imaging part 301. Information for a detected obstacle is inputted into the obstacle position calculation part 303.

The obstacle position calculation part 303 calculates a distance from an obstacle detected by the obstacle detection part 302 and calculates obstacle position data as positional coordinates of the obstacle. Here, a distance from an obstacle is calculated by using a parallax calculated based on an image inputted from the front imaging part 301.

The obstacle image production part 304 extracts an image of an obstacle detected by the obstacle detection part 302 and produces obstacle image data.

Thereby, it is possible for the obstacle sensing part 104 to input obstacle position data and obstacle image data into the head-up display device 101 at a predetermined frame rate.

Furthermore, the eye ball position measurement part 103 has a driver imaging part 311 and an eye ball position calculation part 312, as illustrated in FIG. 3. The driver imaging part 311 is composed of a stereo camera, and an image of the driver 130 that is imaged by the driver imaging part 311 is inputted into the eye ball position calculation part 312.

The eye ball position calculation part 312 specifies an eye ball of the driver 130 from an imaged inputted from the driver imaging part 311, calculates a distance from a specified eye ball 210, and calculates positional coordinates of the eye ball 210 as eye ball position data. Here, a distance from the eye ball 210 is calculated by using a parallax calculated based on an image inputted from the driver imaging part 311.

Thereby, it is possible for the eye ball position measurement part 103 to input eye ball position data into the head-up display device 101 at a predetermined frame rate.

Moreover, the head-up display device 101 has an alert image production part 200 as illustrated in FIG. 3. The alert image production part 200 has an operation processing part 321, a frame buffer 322, and a storage device 323 as respective parts and such respective parts are interconnected via a bus 324.

Here, an example of FIG. 3 is configured such that the alert image production part 200 is contained in the head-up display device 101 but the present invention is not limited thereto, wherein the alert image production part 200 may be configured to be provided separately from the head-up display device 101.

The operation processing part (computer) 321 executes a program stored in the storage device 323 (program that functions as an image production part 330) so that an alert image is produced.

The frame buffer 322 temporarily holds an alert image that is produced by executing a program functioning as the image production part 330 in the operation processing part 321.

The storage device 323 stores a program that functions as the image production part 330. Furthermore, obstacle position data 341 and obstacle image data that are outputted from the obstacle sensing part 104 and eye ball position data 343 that is outputted from the eye ball position measurement art 103.

Here, a program that functions as the image production part 330 may be stored in a variety of external storage media such as a Universal Serial Bus (USB) memory and an SD card and distributed on such a condition. Alternatively, downloading thereof may be executed from a not-illustrated server. Herein, such a program may be provided in a compacted state or an executable form state.

An alert image that is produced by the image production part 330 and held by the frame buffer 322 is outputted to the optical scanning device 201 at a predetermined frame rate and displayed on the transparent screen 110.

4. A Functional Configuration of an Image Production Part

Figure 4:
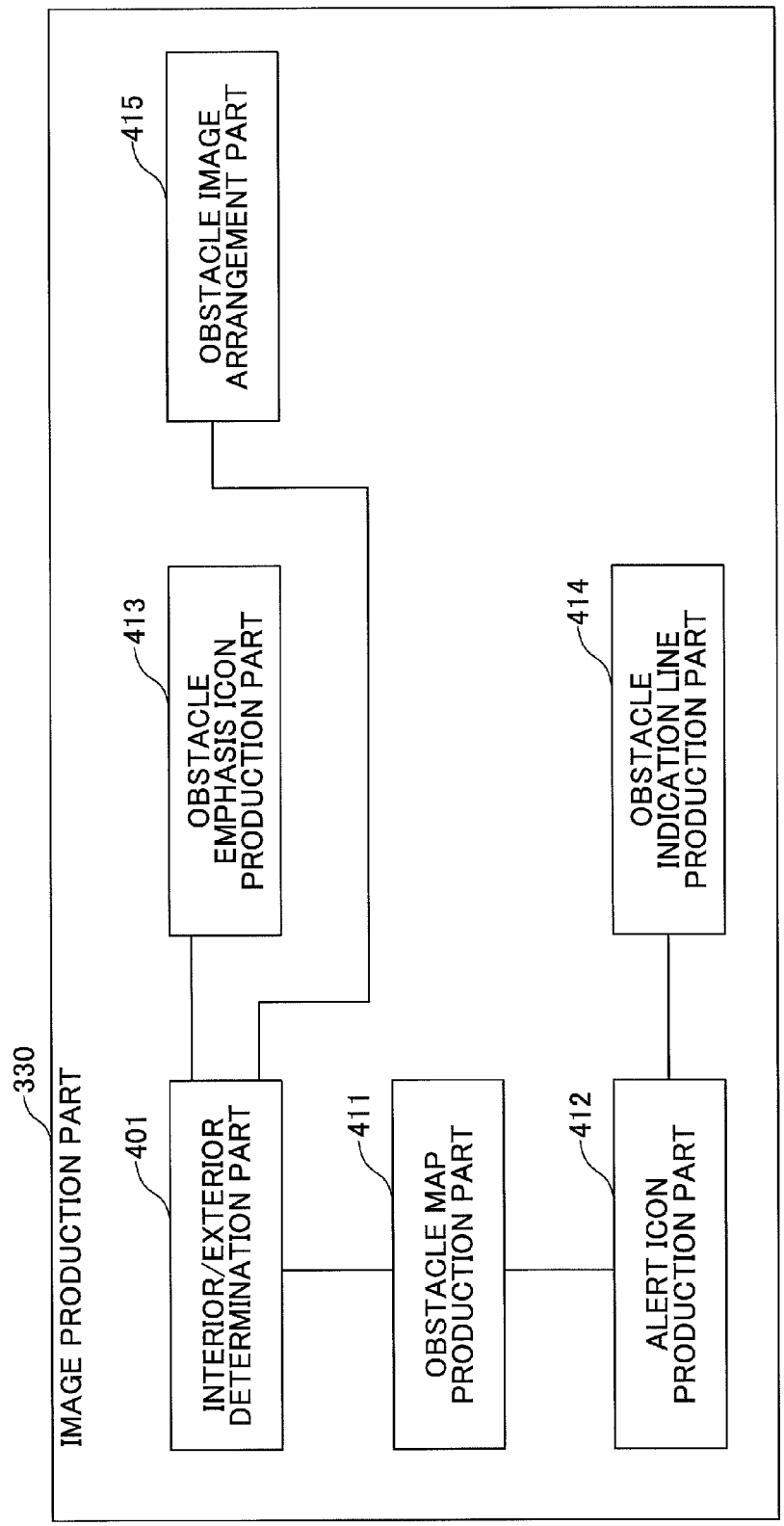
FIG. 4 is a diagram that illustrates a functional configuration of an image production part in a head-up display device.

Next, a functional configuration of the image production part 330 will be described by using FIG. 4 to FIG. 6. FIG. 4 is a diagram that illustrates a functional configuration of the image production part 330. A functional configuration of the image production part 330 will be described below by using FIG. 4 while referring to examples of display of an alert image on the transparent screen 110 as illustrated in FIG. 5 and FIG. 6.

As illustrated in FIG. 4, the image production part 330 has an interior/exterior determination part 401, an obstacle map production part 411, an alert icon production part 412, an obstacle emphasis icon production part 413, an obstacle indication line production part 414, and an obstacle image arrangement part 415.

The interior/exterior determination part 401 determines whether or not an obstacle that is detected by the obstacle sensing part 104 and whose obstacle position data are calculated is present in an area of the transparent screen 110. The image production part 330 produces different alert images depending on whether or not an obstacle that is detected by the obstacle sensing part 104 and whose obstacle position data are calculated is present in an area of the transparent screen 110.

Figure 5:
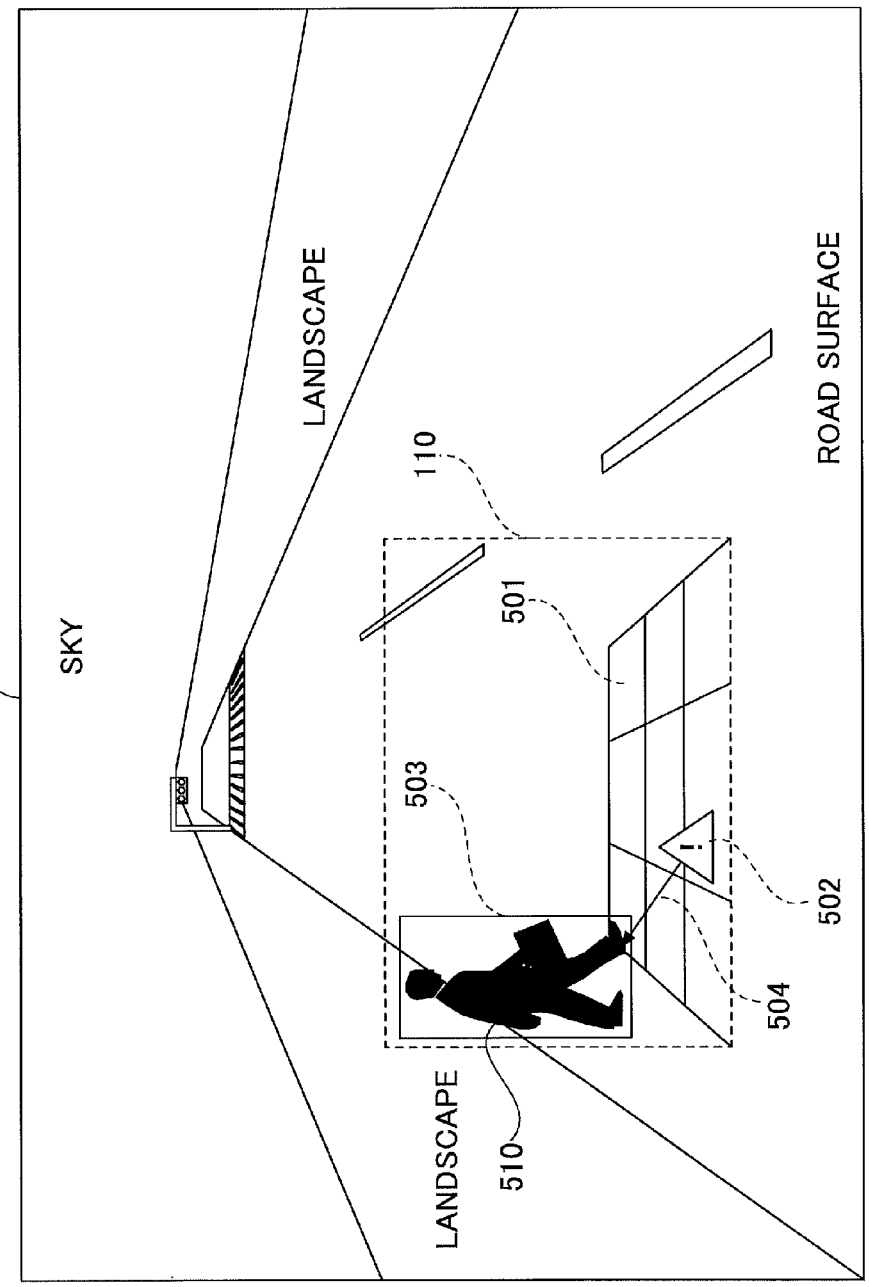
FIG. 5 is a diagram that illustrates an example of display of an alert image on a transparent screen.
Figure 6:
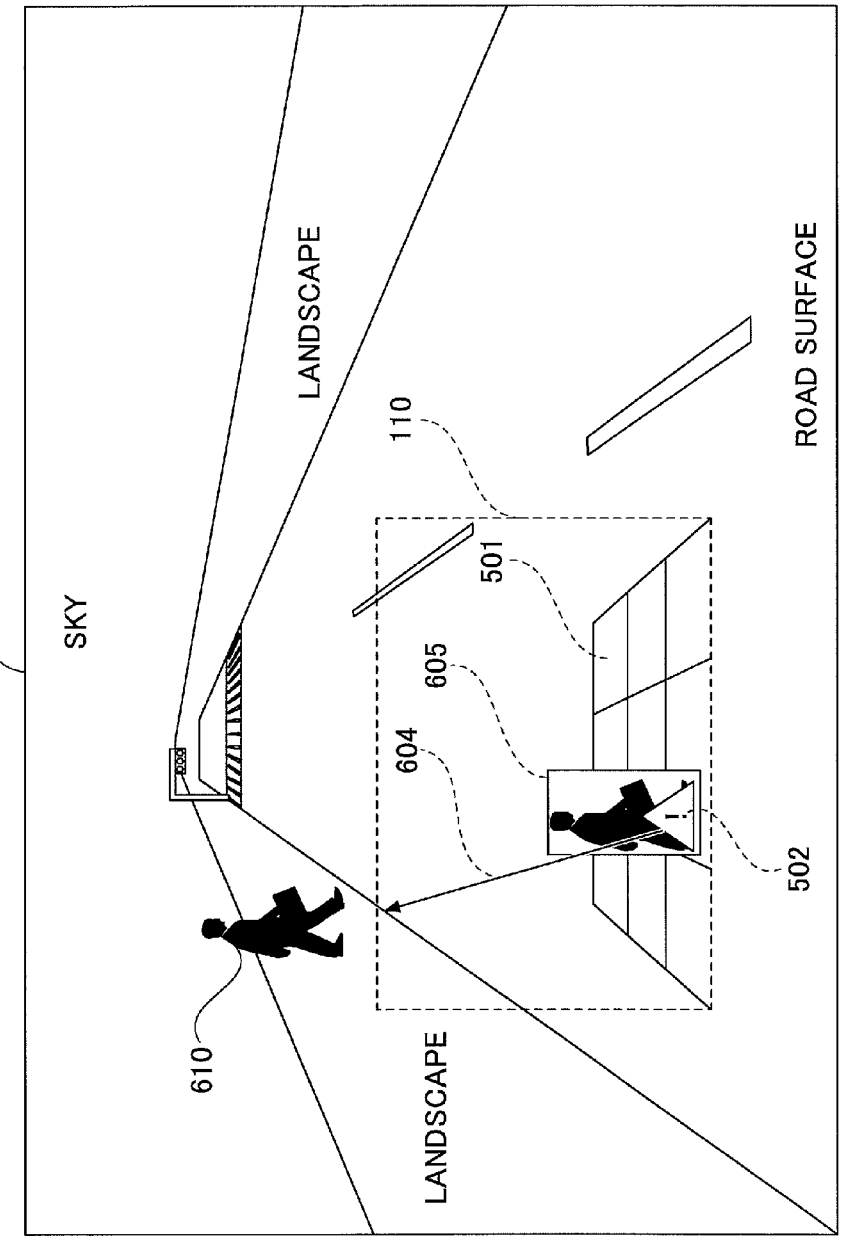
FIG. 6 is a diagram that illustrates an example of display of an alert image on a transparent screen.

Here, among examples of display of an alert image on the transparent screen as illustrated in FIG. 5 and FIG. 6, FIG. 5 is an example of display of an alert image in a case where determination is made such that an obstacle 510 is present in an area of the transparent screen 110. On the other hand, FIG. 6 is an example of display of an alert image in a case where determination is made such that an obstacle 610 is not present in an area of the transparent screen 110. A detail of an interior/exterior determination method for the interior/exterior determination part 401 will be described below.

The obstacle map production part 411 produces an obstacle map that indicates a distribution of one or more obstacles in an imaging area that is imaged by the front imaging part 301 of the obstacle sensing part 104. Moreover, a "coordinate plane image" is produced for displaying, as a two-dimensional coordinate plane, an imaging area that is imaged by the front imaging part 301 of the obstacle sensing part 104, on the transparent screen 110. A coordinate plane image 501 as illustrated in FIG. 5 and FIG. 6 is an image that is produced by the obstacle map production part 411. Here, a detail of a method for production of an obstacle map and the coordinate plane image 501 by the obstacle map production part 411 will be described below.

The alert icon production part 412 produces an "alert icon" for informing a driver of detecting of an obstacle. An alert icon 502 as illustrated in FIG. 5 and FIG. 6 is an icon that is produced by the alert icon production part 412. Here, a detail of a method for arrangement of the alert icon 502 will be described below.

The obstacle emphasis icon production part 413 produces an "obstacle emphasis icon" that is superimposed and displayed on an obstacle detected by the obstacle sensing part 104 in order to emphasize the obstacle. An obstacle emphasis icon 503 as illustrated in FIG. 5 is an icon that is produced by the obstacle emphasis icon production part 413. Here, an obstacle 610 in an example of display of FIG. 6 is not present in an area of the transparent screen 110 so that the obstacle emphasis icon 503 is not produced nor displayed on the transparent screen 110. Here, a detail of a method for arrangement of the obstacle emphasis icon 503 will be described below.

The obstacle indication line production part 414 produces an "obstacle indication line" that is displayed in order to inform a driver of a direction of presence of an obstacle. An obstacle indication line 504 as illustrated in FIG. 5 and an obstacle indication line 604 as illustrated in FIG. 6 are indication lines that are produced by the obstacle indication line production part 414.

In a case where the obstacle 510 is present in an area of the transparent screen 110, as illustrated in FIG. 5, the obstacle indication line 504 is displayed so as to connect the alert icon 502 and the obstacle emphasis icon 503. Furthermore, in a case where the obstacle 610 is not present in an area of the transparent screen 110 as illustrated in FIG. 6, the obstacle indication line 604 is displayed in a direction that is directed from the alert icon 502 to the obstacle 610. Here, a detail of a method for display of the obstacle indication line 504 or 604 will be described below.

The obstacle image arrangement part 415 arranges an "obstacle image" in an alert image in order to display, on the transparent screen 110, obstacle image data 342 that are produced by the obstacle image production part 304 of the obstacle sensing part 104. An obstacle image 605 as illustrated in FIG. 6 is an image that is produced by the obstacle image production part 304 and arranged by the obstacle image arrangement part 415. Here, in an example of display of FIG. 5, the obstacle 510 has already been present in an area of the transparent screen 110 and the obstacle emphasis icon 503 has been superimposed and displayed thereon, so that an obstacle image is not displayed. A detail of a method for arrangement of an obstacle image will be described below.

As is clear from a description provided above, in a case where determination is made such that an obstacle is present in an area of the transparent screen 110 as a result of determination in the interior/exterior determination part 401, the image production part 330 produces, as an alert image, an image that includes the following elements:
the coordinate plane image 501;
the alert icon 502;
the obstacle emphasis icon 503; and
the obstacle indication line 504.

On the other hand, in a case where determination is made such that an obstacle is not present in an area of the transparent screen 110, an image is produced, as an alert image, that includes the following elements:
the coordinate plane image 501;
the alert icon 502;
the obstacle indication line 604; and
the obstacle image 605.

5. A Detail of Processing for Each Part that Composes an Image Production Part Next, a detail of processing for each part that composes the image production part 330 will be described.

<5.1 A Detail of an Interior/Exterior Determination Method in the Interior/Exterior Determination Part 401>

Figure 7:
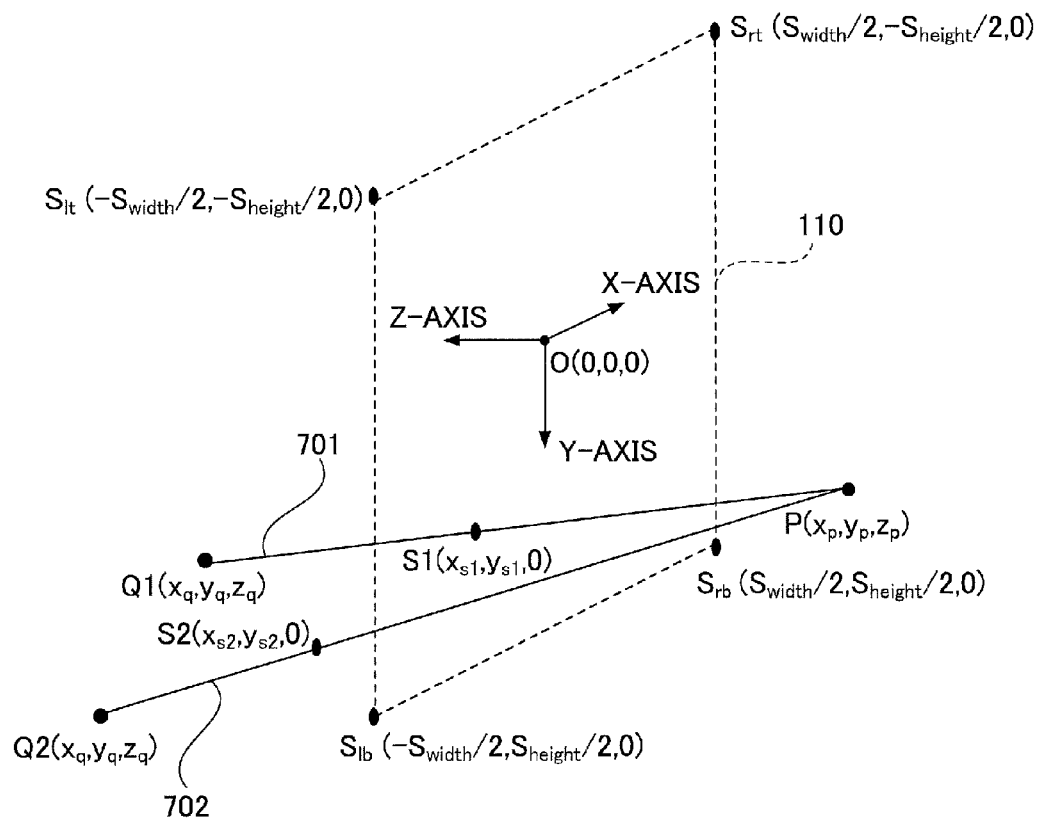
FIG. 7 is a diagram that illustrates an interior/exterior determination method for an obstacle in an interior/exterior determination part.

First, a detail of an interior/exterior determination method in the interior/exterior determination part 401 will be described. FIG. 7 is a diagram for illustrating a detail of an interior/exterior determination method in the interior/exterior determination part 401. Specifically, the diagram is to illustrate a transparent screen coordinate system wherein a central position of the transparent screen 110 is an origin O (0, 0, 0) and a right direction, a downward direction, and a depth direction of the transparent screen 110 as viewed from the driver 130 are an X-axis, a Y-axis, and a Z-axis, respectively.

In FIG. 7, $Q_1$ $(x_q, y_q, z_q)$ is obstacle position data 341 that represent positional coordinates of the obstacle 510. Furthermore, $Q_2$ $(x_q, y_q, z_q)$ is obstacle position data 341 that represent positional coordinates of the obstacle 610. Moreover, P $(x_q, y_q, z_q)$ is eye ball position data 343 that indicate a positional coordinate of the eye ball 210 of the driver 130.

Herein, as a width and a height of the transparent screen 110 are $S_{width}$ and $S_{height}$, respectively, coordinates of respective vertexes of the transparent screen 110 are as follows:
$S_{lt}=(-S_{width}/2, -S_{height}/2, 0)$
$S_{rt}=(S_{width}/2, -S_{height}/2, 0)$
$S_{lb}=(-S_{width}/2, S_{height}/2, 0)$
$S_{rb}=(S_{width}/2, S_{height}/2, 0)$ The interior/exterior determination part 401 calculates a point of intersection between a straight line 701 or 702 that passes through eye ball position data P $(x_q, y_q, z_q)$ and each of obstacle position data $Q_1$ $(x_q, y_q, z_q)$ and $Q_2$ $(x_q, y_q, z_q)$ and the transparent screen 110.

Specifically, a point of intersection $S_1$ $(x_{s1}, y_{s1}, 0)$ is calculated by substituting "0" into a z-coordinate of a primary expression that indicates the straight line 701. Furthermore, a point of intersection $S_2$ $(x_{s2}, y_{s2}, 0)$ is calculated by substituting "0" into a z-coordinate of a primary expression that indicates the straight line 702.

The interior/exterior determination part 401 determines that an obstacle is present in an area of the transparent screen 110 if a calculated point of intersection is present in an area of the transparent screen 110. On the other hand, determination is made such that an obstacle is not present in an area of the transparent screen 110 if a calculated point of intersection is not present in an area of the transparent screen 110.

Specifically, determination is made based on whether or not an x-coordinate $(x_{s1})$ and a y-coordinate $(y_{s1})$ of a point of intersection $S_1$ satisfy the following formulas (1):

$$-\frac{Swidth}{2} \le x_{s1} \le \frac{Swidth}{2}$$
$$-\frac{Sheight}{2} \le y_{s1} \le \frac{Sheight}{2}.$$

Similarly, a determination is made based on whether or not an x-coordinate $(x_{s2})$ and a y-coordinate $(y_{s2})$ of a point of intersection $S_2$ satisfy the following formulas (2):

$$-\frac{Swidth}{2} \le x_{s2} \le \frac{Swidth}{2}$$
$$-\frac{Sheight}{2} \le y_{s2} \le \frac{Sheight}{2}.$$

The interior/exterior determination part 401 determines that the obstacle 510 is present in an area of the transparent screen 110, if formulas (1) are satisfied. Similarly, determination is made such that the obstacle 610 is present in an area of the transparent screen 110, if formulas (2) are satisfied. Here, in an example of FIG. 7, the obstacle 510 satisfies formulas (1) to be determined as being present in an area of the transparent screen 110 and the obstacle 610 does not satisfy formulas (2) to be determined as being not present in an area of the transparent screen 110.

<5.2 a Description of a Method for Production of an Obstacle Map and a Coordinate Plane Image in an Obstacle Map Production Part>

Figure 8A:
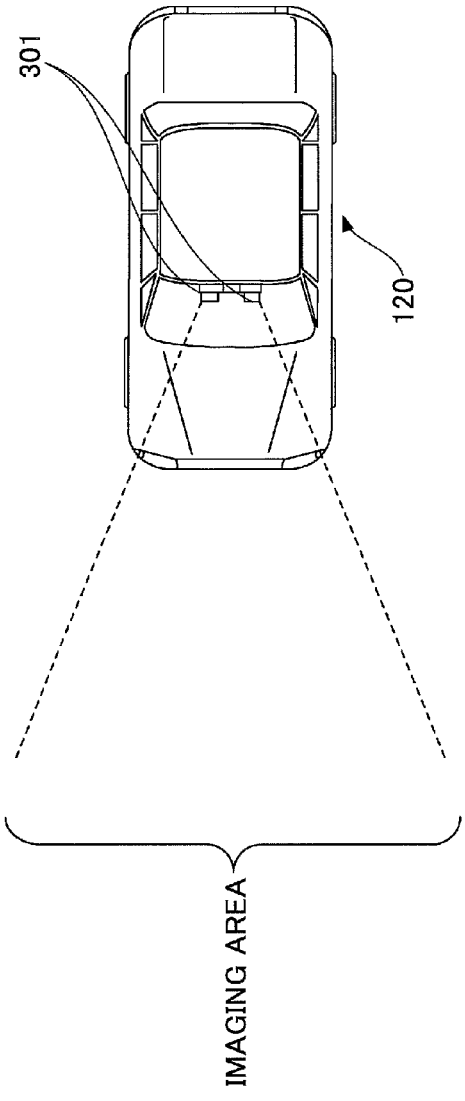
FIG. 8A and FIG. 8B are diagrams that illustrate an image area that is imaged by a front imaging part.
Figure 8B:
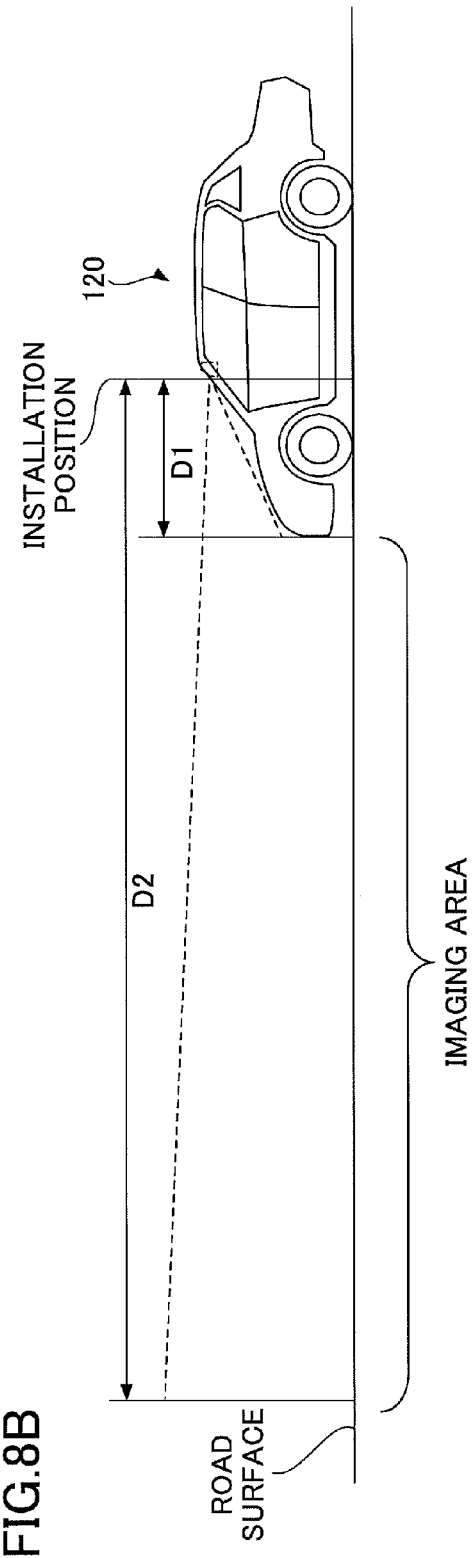

Next, a detail of a method for production of an obstacle map and a coordinate plane image 501 in the obstacle map production part 411 will be described. FIG. 8A and FIG. 8B are diagrams that illustrate an imaging area that is imaged by the front imaging part 301.

The front imaging part 301 that is installed on a ceiling part of the vehicle 120 and images a front side of the vehicle 120 through a windshield thereof has an imaging area as illustrated in FIG. 8A in a direction in plane.

Furthermore, an imaging area from a position at a distance D1 from an installation position (a distance from an installation position of the front imaging part 301 to an end position of the vehicle 120) to a position at a distance D2 is had in a direction of a depth (FIG. 8B). Thus, an imaging area is provided from an end position of the vehicle 120, and thereby, for example, even when the vehicle 120 is in a stopping state thereof and an obstacle is present at an end position of the vehicle 120, it is possible to display an alert icon and call attention to the driver 130.

Here, a distance D2 that specifies an imaging area in a direction of a depth may be set at a predetermined fixed value or may be variable depending on a running velocity of the vehicle 120. For example, a distance D2 that specifies an imaging area in a direction of a depth may be configured to be large in a case where a running speed is high or small in a case where the running speed is low. Thereby, it is possible to keep a sufficient time for a driver to take avoidance behavior in a case where a running speed is high.

Then, a production method for producing an obstacle map and the coordinate plane image 501 based on an imaging area as illustrated in FIG. 8A and FIG. 8B will be described by using FIG. 9A, FIG. 9B, and FIG. 9C. FIG. 9A, FIG. 9B, and FIG. 9C are diagrams that illustrate a production method for producing an obstacle map and the coordinate plane image 501 based on an imaging area for the front imaging part 301.

FIG. 9A illustrates a state in such a manner that an imaging area for the front imaging part 301 is viewed from a top of the vehicle 120. As a two-dimensional coordinate system is represented by an Xb-axis that is a transverse axis, a Zb-axis that is a longitudinal axis, and further an origin Ob that is present at an end position of the vehicle 120 and a central position in a direction of the Xb-axis as illustrated in FIG. 9A, it is possible to represent an imaging area as illustrated in FIG. 8A and FIG. 8B by a trapezoidal area 900.

Herein, coordinates of a vertexes at a side of the origin Ob are $(X_{min}, 0)$ and $(-X_{min}, 0)$ in the area 900 and a distance in a direction of a depth (a direction of the Zb-axis) is $Z_{max}$ (that is equal to (D2−D1) in FIG. 8A and FIG. 8B). Furthermore, a slope of a hypotenuse 901 of the trapezoidal area 900 is "a" and it is possible to represent coordinates of vertexes of the area 900 at a side of $Zb=Z_{max}$ as $(1/aZ_{max}+X_{min}, Z_{max})$ and $(-(1/aZ_{max}+X_{min}), Z_{max})$.

That is, it is possible to represent respective coordinates (Xb, Zb) in the area 900 as follows:

$$Db\left\{(Xb, Zb) \middle| -X\min - \frac{1}{a}Zb \le Xb \le X\min + \frac{1}{a}Zb, 0 \le Zb \le Z\max\right\}(a>0)$$

In the obstacle map production part 411, a detected obstacle (for example, the obstacle 510 or the obstacle 610) is mapped in the area 900 based on the obstacle position data 341. Moreover, the area 900 with an obstacle being mapped therein is transformed into a map coordinate system to produce an obstacle map.

FIG. 9B is a diagram that illustrates a map coordinate system that is a two-dimensional coordinate system with an Xm-axis that is a transverse axis, a Zm-axis that is a longitudinal axis and Om that is an origin, and that is produced by transforming the trapezoidal area 900 into a normalized square area 910. It is possible to represent respective coordinates (Xm, Zm) in the area 910 as follows:

$$Dm\{(Xm, Ym)|-0.5 \le Xm \le 0.5, 0 \le Xm \le 1\}(a>0).$$

Here, it is possible to execute transformation of respective coordinates (Xb, Zb) in the area 900 into respective coordinates (Xm, Zm) in the area 910 in accordance with the following formulas:

$$Xm = 0.5 \times \frac{Xb}{\left(X\min + \frac{1}{a}Zb\right)}$$

$$Zm = \frac{Zb}{Z\max}.$$

However, transformation of respective coordinates (Xb, Zb) in the area 900 into respective coordinates (Xm, Zm) in the area 910 is not limited to the above formulas. For example, in order that information of neighborhood of the vehicle 120 in the area 900 occupies much more in the area 910 (in order to cause neighborhood of the vehicle 120 to seem large), a configuration may be provided to execute transformation that uses logarithm as follows:

$$Xm = 0.5 \times \frac{Xb}{\left(X\min + \frac{1}{a}Zb\right)}$$

$$Zm = \log_{1+Z\max}(1 + Zb).$$

The obstacle map production part 411 produces the coordinate plane image 501 as illustrated in FIG. 9C based on a produced area 910. Specifically, an obstacle map is produced by deforming or arranging the area 910 in such a manner that a lower limit position of the area 910 corresponds to a lower limit position of the transparent screen 110 and a size of the area 910 corresponds to a size of the transparent screen 110. Moreover, a map perimeter line 921 is produced that indicates a perimeter of an obstacle map. Moreover, a map auxiliary line 922 is produced that uniformly divides the map perimeter line 921. Thereby, it is possible to represent the coordinate plane image 501 on the transparent screen 110. That is, the coordinate plane image 501 is an image of an imaging area for the front imaging part 301 that is represented by the map perimeter line 921 (a line that specifies a perimeter of an imaging area on the transparent screen 110) and the map auxiliary line 922. Furthermore, an image is configured in such a manner that respective coordinates thereof correspond to respective coordinates in an imaging area at 1:1.

Here, although the map auxiliary lines 922 are arranged at an equal interval in an example of FIG. 9C, an embodiment of the present invention is not limited thereto and may be configured to provide arrangement dependent on an actual distance.

<5.3 A Description of a Method for Arrangement of an Alert Icon>

Figure 10A:
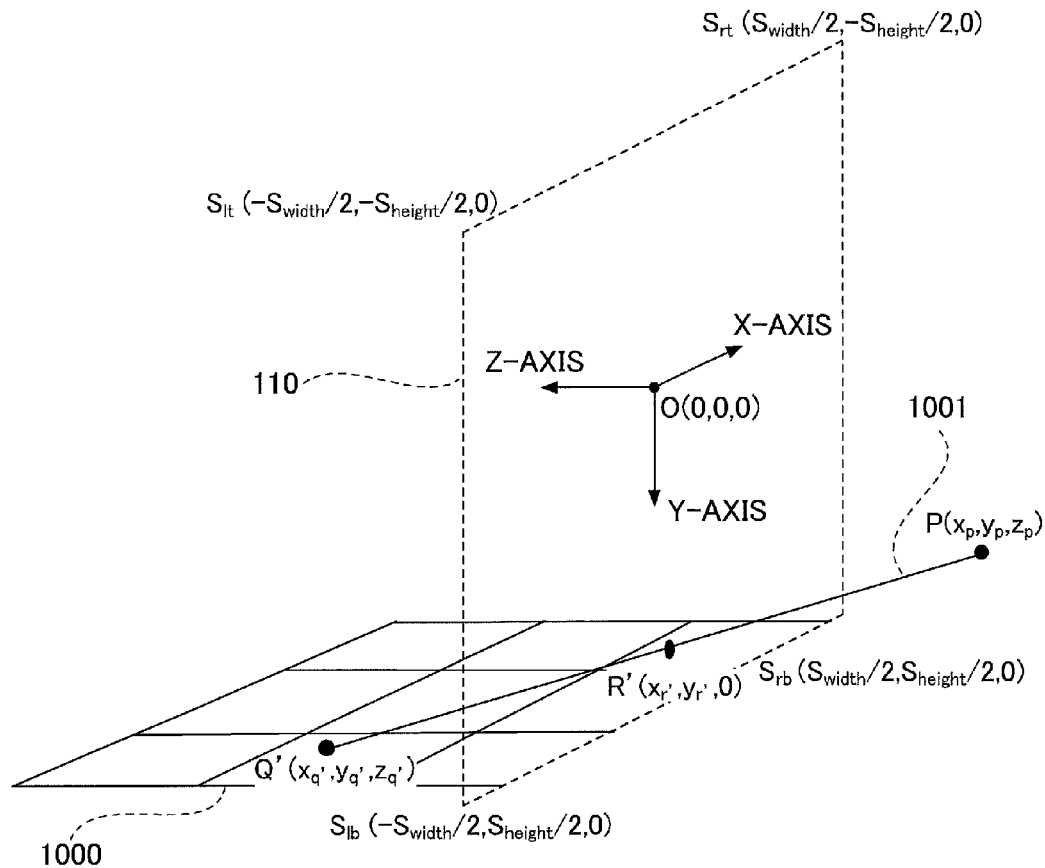
FIG. 10A and FIG. 10B are diagrams for illustrating a method for arrangement of an alert icon.
Figure 10B:
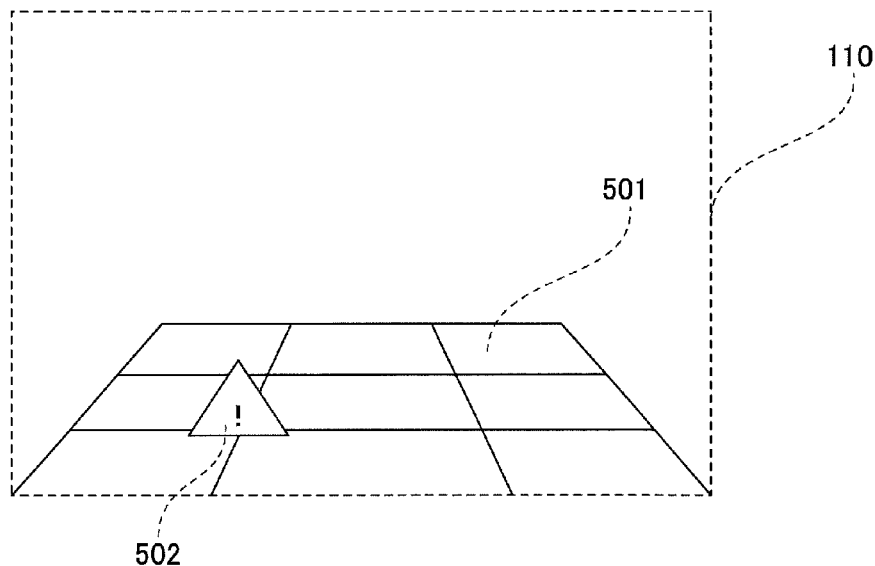

Next, a detail of a method for arrangement of the alert icon 502 produced in the alert icon production part 412 will be described. FIG. 10A and FIG. 10B are diagrams for illustrating a detail of a method for arrangement of the alert icon 502 produced in the alert icon production part 412.

In FIG. 10A, a point Q' indicates a position of an obstacle on an obstacle map 1000. The obstacle map 1000 is arranged in such a manner that the area 910 is deformed to have a size that corresponds to a size of the transparent screen 110, and is provided to be at a lower limit position of the transparent screen 110 and to be orthogonal to the transparent screen 110. Herein, coordinates of a point Q' on the obstacle map 1000 are $(x_q', y_q', z_q')$.

Furthermore, coordinates $(x_p, y_p, z_p)$ of a point P are the eye ball position data 343 that indicate coordinates of a position of the eye ball 210 of the driver 130. Moreover, a straight line 1001 is a straight line that passes through a position (Q') of an obstacle on the obstacle map 1000 and a position (P) of the eye ball 210 of the driver 130.

The alert icon production part 412 calculates the straight line 1001 that passes through a position (Q') of an obstacle on the obstacle map 1000 and a position (P) of the eye ball 210 of the driver 130. Moreover, a point of intersection R' $(x_r', y_r', 0)$ between such a straight line 10001 and the transparent screen 110 is calculated.

Then, the alert icon production part 412 arranges the produced alert icon 502 in an alert image in such a manner that such a produced alert icon 502 is displayed at a position of such a point of intersection R' $(x_r', y_r', 0)$.

FIG. 10B illustrates a state in such a manner that the alert icon 502 that is arranged to be displayed at a position of a point of intersection R' by the alert icon production part 412 is displayed on the transparent screen 110.

Thus, the alert icon production part 412 controls arrangement of such an alert icon 502 in such a manner that it is possible for the driver 130 to view the alert icon 502 so as to be displayed at a position of an obstacle on the coordinate plane image 501. Thus, it is possible to perceive presence of an obstacle and an approximate position thereof instantaneously.

<5.4 a Description of a Method for Arrangement of an Obstacle Emphasis Icon>

Figure 11A:
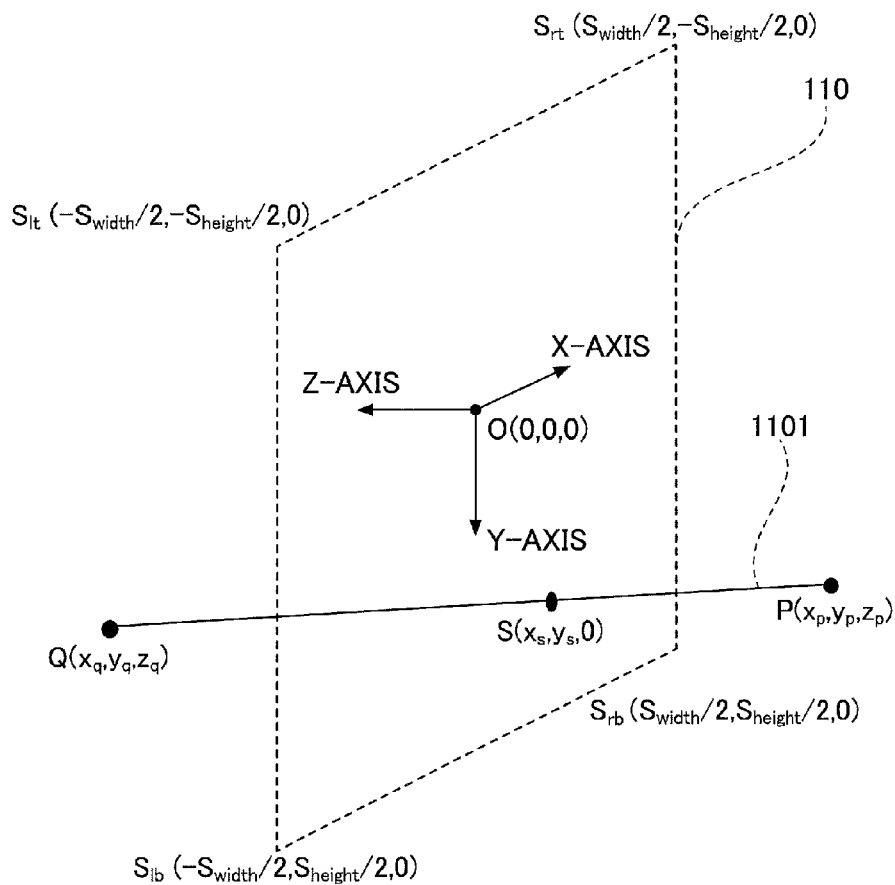
FIG. 11A and FIG. 11B are diagrams for illustrating a method for arrangement of an obstacle emphasis icon.
Figure 11B:
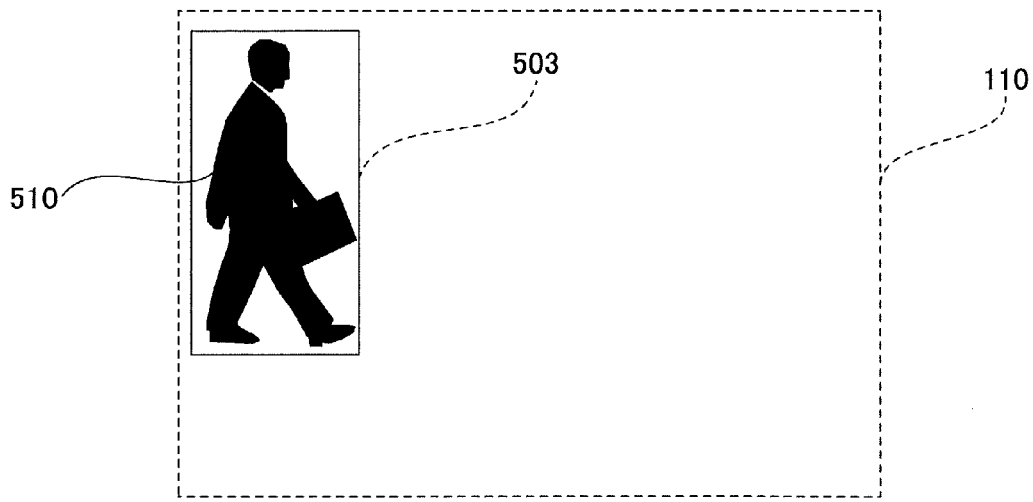

Next, a detail of a method for arrangement of the obstacle emphasis icon 503 produced in the obstacle emphasis icon production part 413 will be described. FIG. 11A and FIG. 11B are diagrams that illustrate a detail of a method for arrangement of the obstacle emphasis icon 503 produced in the obstacle emphasis icon production part 413.

FIG. 11A is a diagram that illustrates a transparent screen coordinate system wherein a central position of the transparent screen 110 is an origin O (0, 0, 0), and a right direction, a downward direction, and a depth direction of the transparent screen 110, when viewed from the driver 130, are an X-axis, a Y-axis, and a Z-axis, respectively.

In a transparent screen coordinate system, a point Q indicates the obstacle position data 341 that represent a coordinate position of an obstacle. Furthermore, coordinates $(x_p, y_p, z_p)$ of a point P are the eye ball position data 343 that indicate a coordinate position of the eye ball 210 of the driver 130. Moreover, a straight line 1101 is a straight line that passes through a position (Q) of an obstacle and a position (P) of the eye ball 210 of the driver 130.

The obstacle emphasis icon production part 413 calculates the straight line 1101 that passes through a position (Q) of an obstacle and a position (P) of the eye ball 210 of the driver 130 and further calculates a point of intersection S ($x_s$, $y_s$, 0) between such a straight line 1101 and the transparent screen 110.

Then, the obstacle emphasis icon production part 413 arranges the obstacle emphasis icon 503 in an alert image in such a manner that the produced obstacle emphasis icon 503 is displayed at a position of such a point of intersection S ($x_s$, $y_s$, 0) in the transparent screen 110.

Here, it is possible to calculate the straight line 1101 (straight line 1) that passes through a position (Q) of an obstacle and a position (P) of the eye ball 210 of the driver 130 in accordance with the following formula:

$$l = (1-\lambda)P + \lambda Q.$$

Furthermore, it is possible to calculate a point of interaction S between the straight line 1101 and the transparent screen 110 in accordance with the following formula:

$$S = \begin{bmatrix} \dfrac{z_q x_p + z_p x_q}{z_p - z_q} \\ \dfrac{z_q x_p + z_p x_q}{z_p - z_q} \\ 0 \end{bmatrix}.$$

FIG. 11B illustrates a state in such a manner that the obstacle emphasis icon 503 produced in the obstacle emphasis icon production part 413 and arranged to be displayed at a position of such a point of section S ($x_s$, $y_s$, 0) is displayed in the transparent screen 110. As illustrated in FIG. 11B, the obstacle emphasis icon 503 is arranged to be displayed at a position of a point of intersection S ($x_s$, $y_s$, 0), and thereby the driver 130 views the obstacle 510 superimposed thereon.

<5.5 A Description of a Method for Display of an Obstacle Indication Line (in a Case where an Obstacle is Present in an Area of a Transparent Screen)>

Figure 12A:
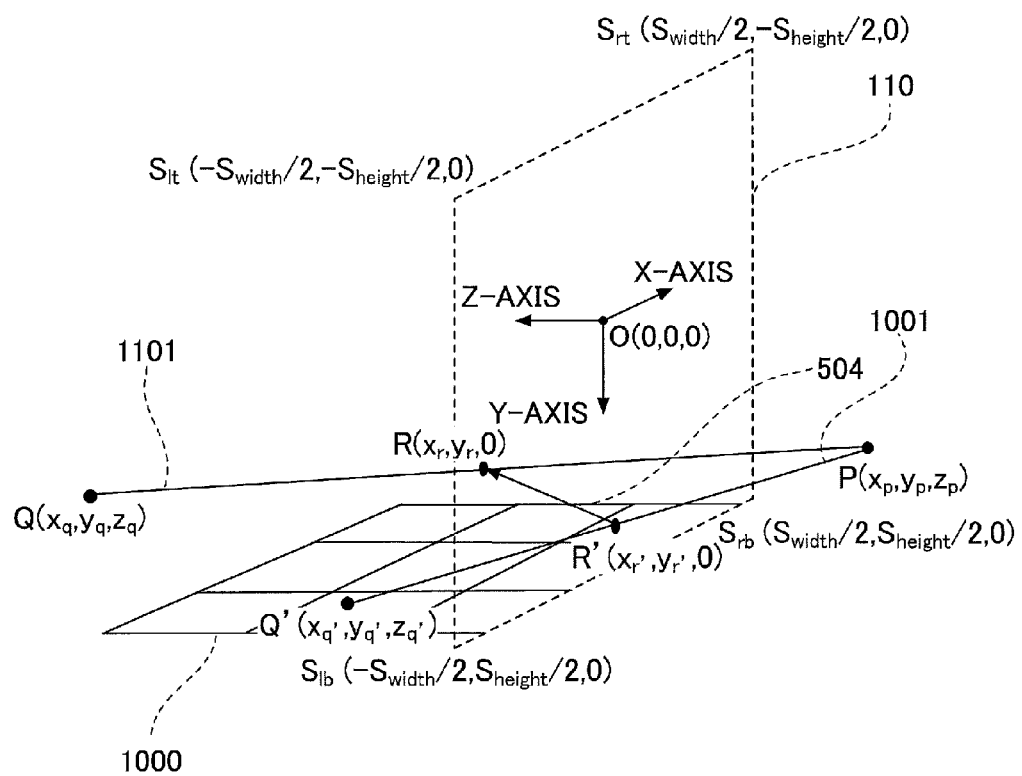
FIG. 12A and FIG. 12B are diagrams for illustrating a method for display of an obstacle indication line.
Figure 12B:
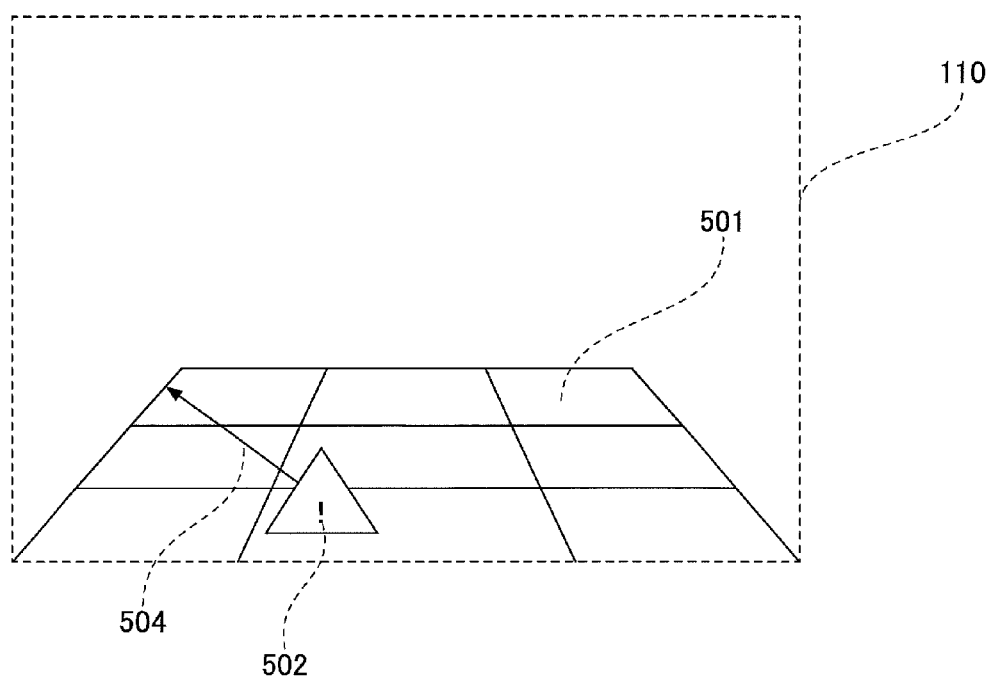

Next, a method for display of the obstacle indication line 504 produced in the obstacle indication line production part 414 will be described. FIG. 12A and FIG. 12B are diagrams for illustrating a method for display of the obstacle indication line 504 produced in the obstacle indication line production part 414.

FIG. 12A is a diagram that illustrates a transparent screen coordinate system wherein a central position of the transparent screen 110 is an origin O (0, 0, 0) and a right direction, a downward direction, and a depth direction of the transparent screen 110, when viewed from the driver 130, are an X-direction, a Y-direction, and a Z-direction, respectively.

In a transparent screen coordinate system, a point Q indicates the obstacle position data 341 that represent position coordinates of an obstacle. Furthermore, coordinates $(x_p, y_p, z_p)$ of a point P are the eye ball position data 343 that illustrate a coordinate position of the eye ball 210 of the driver 130. Moreover, the straight line 1101 is a straight line that passes through a position (Q) of an obstacle and a position (P) of the eye ball 210 of the driver 130.

Meanwhile, a point Q' indicates a position of an obstacle on the obstacle map 1000. The obstacle map 1000 is such that the area 910 is deformed into a size that corresponds to a size of the transparent screen 110 and arranged to be at a lower limit position of the transparent screen 110 and to be orthogonal to the transparent screen 110. Herein, coordinates of a point Q' on the obstacle 1000 are ($x_q'$, $y_q'$, $z_q'$).

Furthermore, the straight line 1001 is a straight line that passes through a position (Q') of an obstacle on the obstacle map 1000 and a position (P) of the eye ball 210 of the driver 130.

The obstacle indication line production part 414 calculates the straight line 1101 that passes through a position (Q) of an obstacle and a position (P) of the eye ball 210 of the driver 130 and further calculates a point of intersection R ($x_r$, $y_r$, 0) between such a straight line 1101 and the transparent screen 110.

Furthermore, the straight line 1001 that passes through a position (Q') of an obstacle on the obstacle map 1000 and a position (P) of the eye ball 210 of the driver 130 is calculated, and further, a point of intersection R' ($x_r'$, $y_r'$, 0) between such a straight line 1001 and the transparent screen 110 is calculated.

Then, the obstacle indication line production part 414 calculates a vector with an origin at a position of a point of intersection R' ($x_r'$, $y_r'$, 0) and an end point at a position of a point of intersection R ($x_r$, $y_r$, 0) and thereby produces the obstacle indication line 504.

FIG. 12B illustrates a state in such a manner that the obstacle indication line 504 produced in the obstacle indication line production part 414 and arranged to be displayed between a point of intersection R' ($x_r'$, $y_r'$, 0) and a point of intersection R ($x_r$, $y_r$, 0) is displayed on the transparent screen 110.

Thus, the obstacle indication line production part 414 uses an obstacle indication line to indicate a direction where an obstacle is present. Hence, it is possible for a driver to perceive a direction where an obstacle is present, instantaneously.

Here, an obstacle indication line is not limited to an arrow, although an example of FIG. 12B illustrates an arrow for the obstacle indication line 504.

<5.6 A Description of a Method for Arrangement of an Obstacle Image>

Figure 13A:
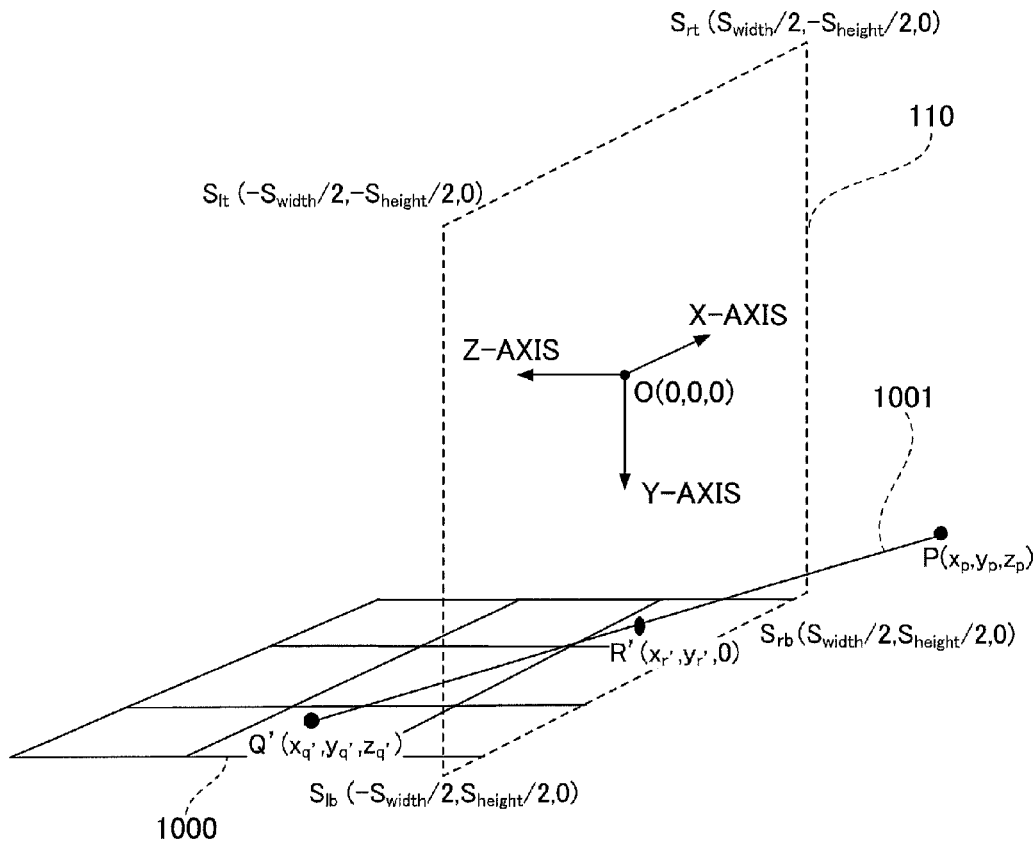
FIG. 13A and FIG. 13B are diagrams for illustrating a method for arrangement of an obstacle image.
Figure 13B:
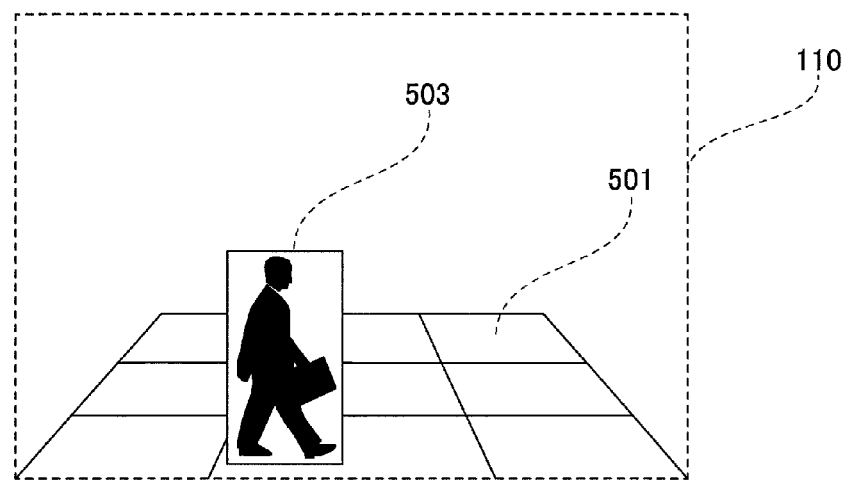

Next, a detail of a method for arrangement of an obstacle image 605 by the obstacle image arrangement part 415 will be described. FIG. 13A and FIG. 13B are diagrams that illustrate a detail of a method for arrangement of the obstacle image 605 by the obstacle image arrangement part 415.

In FIG. 13A, a point Q' indicates a position of an obstacle on the obstacle map 1000. The obstacle map 1000 is such that the area 910 is deformed into a size that corresponds to a size of the transparent screen 110 and arranged to be at a lower limit position of the transparent screen 110 and to be orthogonal to the transparent screen 110. Herein, coordinates of a point Q' on the obstacle map 1000 are $(x_q', y_q', z_q')$.

Furthermore, coordinates $(x_p, y_p, z_p)$ of a point P are the eye ball position data 343 that illustrate a coordinate position of the eye ball 210 of the driver 130. Moreover, the straight line 1001 is a straight line that passes through a position (Q') of an obstacle on the obstacle map 1000 and a position (P) of the eye ball 210 of the driver 130.

The obstacle image arrangement part 415 calculates the straight line 1001 that passes through a position (Q') of an obstacle on the obstacle map 1000 and a position (P) of the eye ball 210 of the driver 130, and further, calculates a point of intersection R' $(x_r', y_r', 0)$ between such a straight line 1001 and the transparent screen 110.

Then, the obstacle image arrangement part 415 arranges the obstacle image 605 in an alert image to be displayed at a position of such a point of intersection R' $(x_r', y_r', 0)$.

FIG. 13B illustrates a state in such a manner that the obstacle image 605 arranged to be displayed at a position of a point of intersection R' $(x_r', y_r', 0)$ by the obstacle image arrangement part 415 is displayed on the transparent screen 110.

Thus, an obstacle image is displayed at a position where an alert icon is viewed, so that it is possible for the driver 130 to perceive presence of an obstacle instantaneously and it is possible to understand a content of such an obstacle.

Here, although calculation of the straight line 1001 and a point of intersection R' is executed by the obstacle image arrangement part 415 in the above description, it goes without saying that a configuration may be provided for using a calculation result in the alert icon production part 412.

<5.7 A Description of a Method for Display of an Obstacle Indication Line (in a Case where an Obstacle is not Present in an Area of a Transparent Screen)>

Figure 14A:
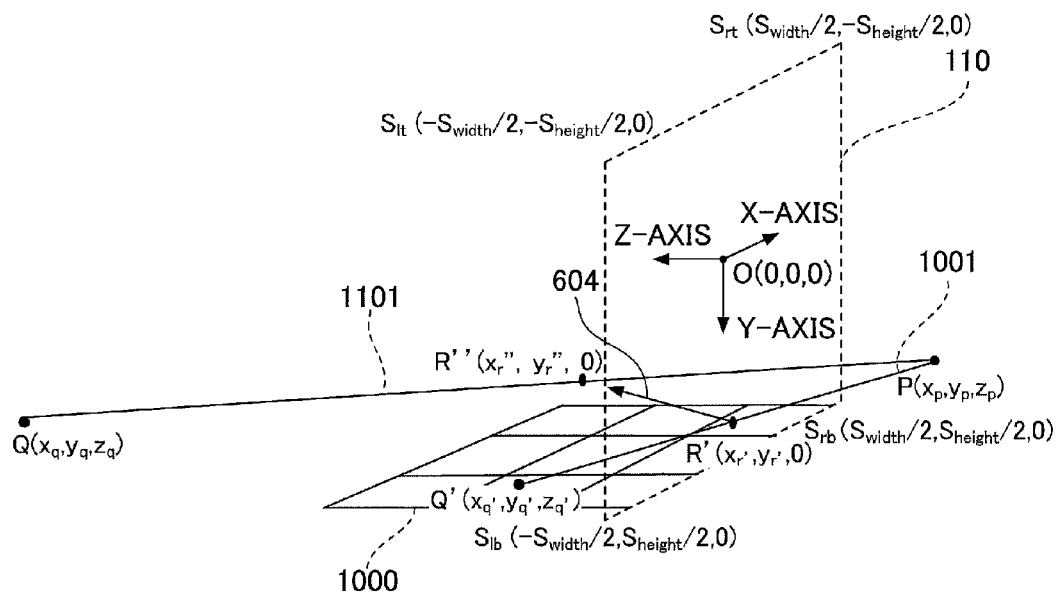
FIG. 14A and FIG. 14B are diagrams for illustrating a method for display of an obstacle indication line.
Figure 14B:
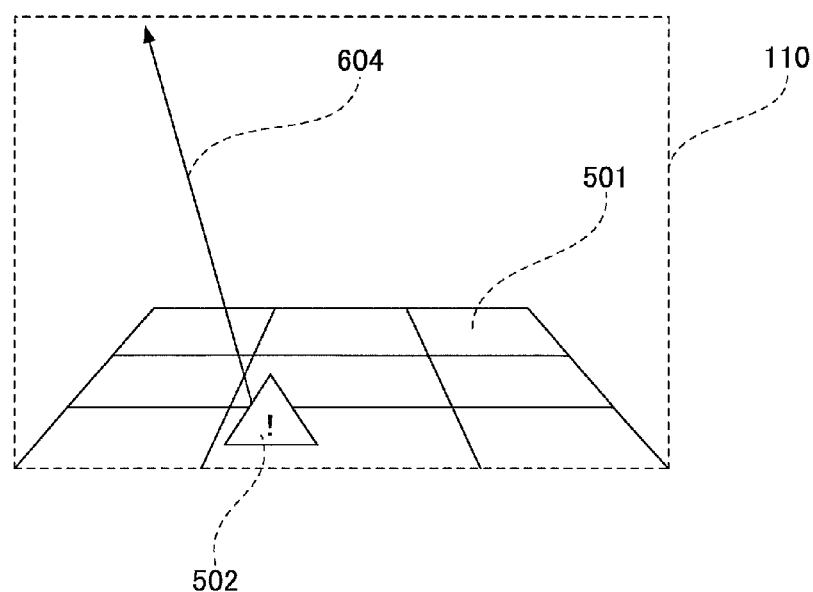

Next, a method for display of the obstacle indication line 604 produced in the obstacle indication line production part 414 will be described. FIG. 14A and FIG. 14B are diagrams for illustrating a method for display of the obstacle indication line 604 produced in the obstacle indication line production part 414.

FIG. 14A is a diagram that illustrates a transparent screen coordinate system wherein a central position of the transparent screen 110 is an origin O (0, 0, 0) and a right direction, a downward direction, and a depth direction of the transparent screen 110, when viewed from the driver 130, are an X-axis, a Y-axis, and a Z-axis.

In a transparent screen coordinate system, a point Q indicates the obstacle position data 341 that represent positional coordinates of an obstacle. Furthermore, coordinates $(x_p, y_p, z_p)$ of a point P are the eye ball position data 343 that represent a coordinate position of the eye ball 210 of the driver 130. Moreover, the straight line 1101 is a straight line that passes through a position (Q) of an obstacle and a position (P) of the eye ball 210 of the driver 130.

Meanwhile, a point Q' indicates a position of an obstacle on the obstacle map 1000. The obstacle map 1000 is such that the area 910 is deformed into a size adapted to a size of the transparent screen 110 and is arranged to be at a lower limit position of the transparent screen 110 and to be orthogonal to the transparent screen 110. Herein, coordinates of a point Q' on the obstacle map 1000 are $(x_q', y_q', z_q')$.

Furthermore, the straight line 1001 is a straight line that passes through a position (Q') of an obstacle on the obstacle map 1000 and a position (P) of the eye ball 210 of the driver 130.

The obstacle indication line production part 414 calculates the straight line 1101 that passes through a position (Q) of an obstacle and a position (P) of the eye ball 210 of the driver 130, and further, calculates a point of intersection between such a straight line 1101 and the transparent screen 110.

Herein, an obstacle in an example of FIG. 14A is not present in an area of the transparent screen 110 and the straight line 1101 and the transparent screen 110 do not intersect. In this case, a point of intersection is not present. Hence, the obstacle indication line production part 414 calculates a point R" with a Z-axis coordinate=0 (xr", yr", 0) that is a point on the straight line 1101 (wherein a point R" is a point outside the transparent screen 110).

Furthermore, the straight line 1001 that passes through a position (Q') of an obstacle on the obstacle map 1000 and a position (P) of the eye ball 210 of the driver 130 is calculated, and further, a point of intersection R' $(x_r', y_r', 0)$ between such a straight line 1001 and the transparent screen 110 is calculated.

Then, the obstacle indication line production part 414 produces, as the obstacle indication line 604, a vector with a length to a perimeter of the transparent screen 110, among vectors with a point of intersection R' $(x_r', y_r', 0)$ that is provided at a position of an origin and a point of intersection R" $(x_r'', y_r'', 0)$ that is provided at a position of an end point.

FIG. 14B illustrate a state in such a manner that the obstacle indication line 604 produced in the obstacle indication line production part 414 and arranged to be displayed between a point of intersection R' $(x_r', y_r', 0)$ and a point of intersection R" $(x_r'', y_r'', 0)$ is displayed on the transparent screen 110.

Thus, even when an obstacle is not present in an area of the transparent screen 110, a configuration is provided to display, as the obstacle indication line 604, a direction where an obstacle is present, so that it is possible for the driver 130 to perceive a position of an obstacle instantaneously.

6. A Flow of an Image Production Process in an Image Production Part

Figure 15:
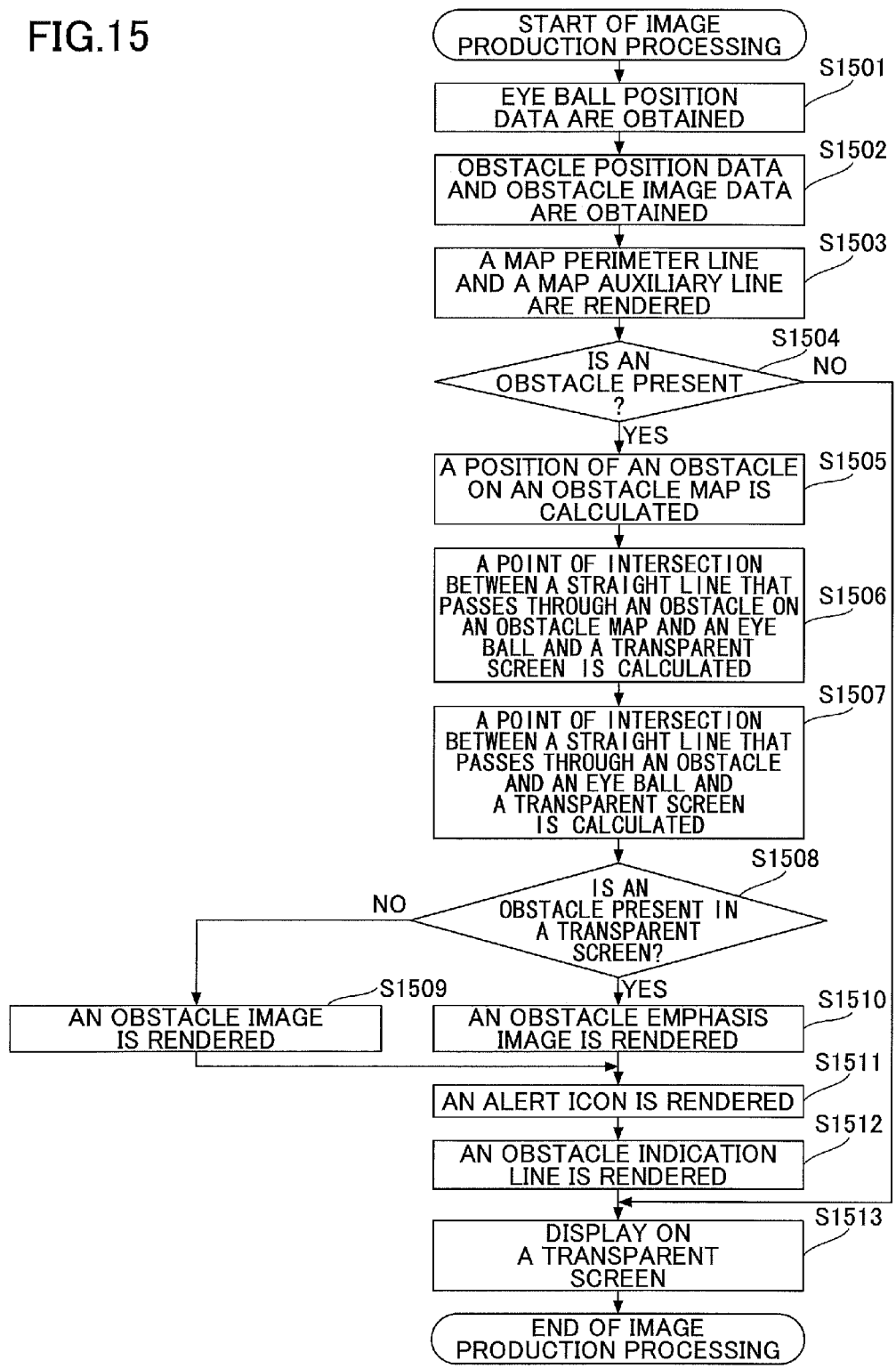
FIG. 15 is a flowchart that illustrates a flow of image production processing for producing an alert image.

Next, a flow of an image production process in the image production part 330 for forming an alert image will be described. FIG. 15 is a flowchart that illustrates a flow of an image production process in the image production part 330 for producing an alert image.

At step S1501, the image production part 330 acquires the eye ball position data 343 that represent a position of the eye ball 210 of the driver 130, from the eye ball position measurement part 103. At step S1502, the image production part 330 acquires the obstacle position data 341 and the obstacle image data 342 from the obstacle sensing part 104.

At step S1503, the obstacle map production part 411 produces the obstacle map 1000 and produces, and renders in an alert image, the coordinate plane image 501 that is composed of the map perimeter line 921 and the map auxiliary line 922.

At step 1504, the image production part 330 determines whether or not an obstacle is detected in the obstacle detection part 302. In a case where determination is made in such a manner that an obstacle is not detected, it goes to step S1514 wherein the image production part 330 make a control in such a manner that only the map perimeter line 921 and the map auxiliary line 922 are displayed on the transparent screen 110.

On the other hand, at step S1504, in a case where determination is made in such a manner that an obstacle is detected, it goes to step S1505 wherein the obstacle map production part 411 calculates a position of an obstacle on the obstacle map 1000.

At step S1506, the alert icon production part 412 calculates a point of intersection between a straight line that passes through positional coordinates of an obstacle on the obstacle map 1000 and positional coordinates of an eye ball, and the transparent screen 110. Moreover, at step S1507, the alert icon production part 412 calculates a point of intersection between a straight line that passes through positional coordinates of an obstacle and positional coordinates of an eye ball, and the transparent screen 110.

At step S1508, the interior/exterior determination part 401 determines whether or not an obstacle is present in an area of the transparent screen 110 based on a calculation result at step S1507.

At step S1508, in a case where determination is made in such a manner that an obstacle is not present in an area of the transparent screen 110, it goes to step S1509. At step S1509, the obstacle image arrangement part 415 renders an obstacle image on an alert image in such a manner that the obstacle image is displayed at a point of intersection between a straight line that passes through a position of an obstacle on the obstacle map 1000 and an eye ball, and the transparent screen 110.

Meanwhile, at step S1508, in a case where determination is made in such a manner that an obstacle is present in an area of the transparent screen 110, it goes to step S1510. At step S1510, the obstacle emphasis icon production part 413 renders an obstacle emphasis image on an alert image in such a manner that an obstacle emphasis image is displayed at a point of intersection between a straight line that passes through positional coordinates of an obstacle and an eye ball, and the transparent screen 110.

Moreover, at step S1511, the alert icon production part 412 renders an alert icon on an alert image in such a manner that an alert icon is displayed at a point of intersection between a straight line that passes through a position of an obstacle on the obstacle map 1000 and an eye ball, and the transparent screen 110.

Moreover, at step S1512, the obstacle indication line production part 414 renders the obstacle indication line 504 on an alert image wherein a position of rendering of an alert icon is a position of an origin and a position of rendering of an obstacle emphasis image is a position of an end point. Here, in a case where an obstacle is not present in an area of the transparent screen 110, the obstacle indication line 604 is rendered on an alert image wherein a position of rendering of an alert icon is a position of an origin and a perimeter of a transparent screen is a position of an end point.

At step S1513, the image production part 330 outputs to the optical scanning device 201 an alert image wherein the map perimeter line 921, the map auxiliary line 922, the alert icon 502, the obstacle emphasis icon 503 (or obstacle image 605), and the obstacle indication line 504 or 604 are rendered thereon. Moreover, a control is made in such a manner that an alert image outputted to the optical scanning device 201 is displayed on the transparent screen 110.

Here, as is clear from the flowchart described above, display of an alert image other than the coordinate plane image 501 starts with detection of an obstacle, and the display is ended if an obstacle is not present in an imaging area.

7. Summary

As is clear from the above description, an information processing system according to the present embodiment is:
configured in such a manner that an imaging area in a case where an obstacle sensing part images a front of a vehicle is displayed on a transparent screen as a two-dimensional coordinate plane image; and
configured in such a manner that a position of display of an alert icon on a transparent screen is controlled depending on a position of an eye ball of a driver so that the alert icon is viewed at a position of a detected obstacle on a coordinate plane image.

Thereby, it is possible for a driver to view an alert icon with a less amount of movement of a line of sight and it is possible to perceive an approximate position of an obstacle from a position of an alert icon on a coordinate plane image that represents an imaging area.

Furthermore, an information processing system according to the present embodiment is:
configured in such a manner that an obstacle image is displayed at a position where an alert icon is viewed, in a case where an obstacle is not present in an area of a transparent screen.

Thereby, it is possible for a driver to perceive presence of an obstacle instantaneously. Furthermore, it is possible to understand a content of an obstacle in combination.

Furthermore, an information processing system according to the present embodiment is:
configured in such a manner that a vector to a perimeter of a transparent screen, among vectors having an origin at a position where an alert icon is viewed and being directed to positional coordinates of an obstacle is displayed as an obstacle indication line in a case where the obstacle is not present in an area of the transparent screen.

Thereby, it is possible for a driver to perceive a position of an obstacle instantaneously.

Thus, according to the present embodiment, it is possible for a driver to perceive an approximate position of an obstacle, a content of the obstacle, and an approximate direction in a case where the obstacle appears in an area of a transparent screen, instantaneously, even in a case where an obstacle is not present in the area of the transparent screen.

That is, it is possible for a driver to take avoidance behavior even in a case where a size of a transparent screen is small. In other words, it is possible to provide, in a head-up display device, a display suitable for taking avoidance behavior against an obstacle, for a driver.

A Second Embodiment

Although the first embodiment described above is configured in such a manner that a predetermined icon is displayed as the alert icon 502, an embodiment of the present invention is not limited thereto.

For example, a configuration may be provided in such a manner that a display mode (a size, a color (hue, saturation, or brightness), a shape, presence or absence of blinking, or the like, of the alert icon 502, the obstacle image 605, or the like) is changed depending on a running speed of the vehicle 120. In this case, it is desirable to change a display mode in such a manner that a degree of attention calling against an obstacle is increased as a speed of the vehicle 120 is increased.

Here, a configuration may then be provided in such a manner that a Global Positioning System (GPS) is installed in the head-up display device 101 and a running speed of the vehicle 120 to be monitored is calculated based on an output from such a GPS. Alternatively, a configuration may be provided in such a manner that the head-up display 101 receives a speed measured in the vehicle 120 through an Electronic Control Unit (ECU).

Furthermore, although the first embodiment described above is configured in such a manner that an alert image is displayed on the transparent screen 110 in a case where an obstacle is detected, and thereby it is possible for a driver to take avoidance behavior, an embodiment of the present invention is not limited thereto. For example, a configuration may be provided in such a manner that a control signal for changing a running speed of (decelerating or stopping) the vehicle 120 is outputted in addition to display of an alert image.

A Third Embodiment

In the first and second embodiments described above, a configuration for an alert image to be displayed in a case where an obstacle is detected is provided in such a manner that:

the coordinate plane image 501;
the alert icon 502;
the obstacle emphasis icon 503; and
the obstacle indication line 504 are displayed in a case where such an obstacle is present in an area of the transparent screen; or
the coordinate plane image 501;
the alert icon 502;
the obstacle indication line 604; and
the obstacle image 605 are displayed in a case where such an obstacle is not present in an area of the transparent screen 110. However, an embodiment of the present invention is not limited thereto. For example, a configuration may be provided in such a manner that only the alert icon 502 and the obstacle indication line 504 or 604 are displayed.

FIG. 16 illustrates a case where only the alert icon 502 and the obstacle indication line 604 are displayed as an alert image(s) in a case where an obstacle is detected.

Even by an alert image as illustrated in FIG. 16, it is possible for the driver 130 to take sufficient avoidance behavior against an obstacle.

Other Embodiments

The present invention is not limited to a configuration as illustrated herein, such as a combination of a configuration provided in the above-mentioned embodiment or the like with another element. In regard to these matters, it is possible to execute modification thereof without departing from the spirit of the present invention and it is possible to execute appropriate determination thereof depending on an application mode thereof.

APPENDIX

<Illustrative Embodiments of an Information Processing Device, an Information Processing Method, and a Program>

At least one illustrative embodiment of the present invention may relate to at least one of an information processing device, an information processing method, and a program.

At least one illustrative embodiment of the present invention may be provided by taking the above-mentioned problem(s) into consideration, and may aim at providing, on a head-up display device, a display suitable for taking avoidance behavior against an obstacle by a driver.

At least one illustrative embodiment of the present invention may be an information processing device that has a configuration as described below, that is, an information processing device for producing an alert image that is displayed on a transparent screen that is viewed by a driver for a vehicle, characterized by having a first calculation means for calculating a position of a first icon on the transparent screen in such a manner that such a first icon for indicating that an obstacle is detected is viewed at a position of the obstacle on a two-dimensional coordinate plane in a case where an imaging area for an imaging part is such a two-dimensional coordinate plane and is arranged at a lower limit position of the transparent screen in a case where the obstacle is detected in an image that is imaged by using such an imaging part installed in the vehicle, and a second calculation means for calculating a position of an end point of an indication line on the transparent screen in such a manner that such an indication line is viewed while the position calculated by the first calculation means is an origin and the obstacle is present at the end point in a direction thereof, wherein the alert image is produced by arranging the first icon and the indication line depending on calculation results from the first and second calculation means.

Illustrative Embodiment (1) is an information processing device for producing an alert image that is displayed on a transparent screen that is viewed by a driver for a vehicle, wherein the image processing device is characterized by having a first calculation means for calculating a position of a first icon on the transparent screen in such a manner that such a first icon for indicating that an obstacle is detected is viewed at a position of the obstacle on an two-dimensional coordinate plane in a case where an imaging area for an imaging part is such an two-dimensional coordinate plane and is arranged at a lower limit position of the transparent screen in a case where the obstacle is detected in an image that is imaged by using such an imaging part installed in the vehicle, and a second calculation means for calculating a position of an end point of an indication line on the transparent screen in such a manner that such an indication line is viewed while the position calculated by the first calculation means is an origin and the obstacle is present at the end point in a direction thereof, wherein the alert image is produced by arranging the first icon and the indication line depending on calculation results from the first and second calculation means.

Illustrative Embodiment (2) is the information processing device as described in Illustrative Embodiment (1), characterized by further having a determination means for determining whether or not the obstacle is present in an area of the transparent screen, wherein the alert image is produced in such a manner that an image of the obstacle is viewed at the position calculated by the first calculation means in a case where the determination means determines that the obstacle is not present in an area of the transparent screen.

Illustrative Embodiment (3) is the information processing device as described in Illustrative Embodiment (2), characterized by further having a third calculation means for calculating a position of a second icon on the transparent screen in such a manner that such a second icon for emphasizing the obstacle is viewed at a position superimposed on the obstacle in a case where the determination means determines that the obstacle is present in an area of the transparent screen.

Illustrative Embodiment (4) is the image processing device as described in any one of Illustrative Embodiments (1) to (3), characterized in that the alert image is produced that includes a perimeter line for indicating an imaging area for the imaging part on the two-dimensional coordinate plane.

Illustrative Embodiment (5) is the information processing device as described in Illustrative Embodiment (1), characterized in that the first calculation means calculates a straight line that passes through a position of the obstacle on the two-dimensional coordinate plane and a position of an eye ball of the driver in a case where such a two-dimensional coordinate plane is arranged at a lower limit position of the transparent screen, and calculates a position of a point of intersection between such a calculated straight line and the transparent screen as a position of the first icon on the transparent screen.

Illustrative Embodiment (6) is the information processing device as described in Illustrative Embodiment (1), characterized in that the second calculation means calculates a straight line that passes through a position of the obstacle and a position of an eye ball of the driver and calculates a position of a point of intersection between such a calculated straight line and the transparent screen as a position of an end point of the indication line on the transparent screen.

Illustrative Embodiment (7) is the information processing device as described in Illustrative Embodiment (1), characterized in that the second calculation means calculates a straight line that passes through a position of the obstacle and a position of an eye ball of the driver and calculates a position where a straight line directed to a position of a point of intersection between such a calculated straight line and a plane identical to that of the transparent screen intersects with a perimeter of the transparent screen as a position of an end point of the indication line on the transparent screen.

Illustrative Embodiment (8) is the information processing device as described in Illustrative Embodiment (3), characterized in that the third calculation means calculates a straight line that passes through a position of the obstacle and a position of an eye ball of the driver and calculates a position of a point of intersection between such a calculated straight line and the transparent screen as a position of the second icon on the transparent screen.

Illustrative Embodiment (9) is the information processing device as described in Illustrative Embodiment (4), characterized in that a position of a perimeter line for specifying a depth direction among perimeter lines for indicating an imaging area for the imaging part on the two-dimensional coordinate plane is changed depending on a running velocity of the vehicle.

Illustrative Embodiment (10) is the information processing device as described in Illustrative Embodiment (2), characterized in that a display mode of the first icon or an image of the obstacle is changed depending on a running velocity of the vehicle.

Illustrative Embodiment (11) is an image processing method in an information processing device for producing an alert image that is displayed on a transparent screen that is viewed by a driver for a vehicle, wherein the image processing method is characterized by having a first calculation process for calculating a position of a first icon on the transparent screen in such a manner that such a first icon for indicating that an obstacle is detected is viewed at a position of the obstacle on a two-dimensional coordinate plane in a case where an imaging area for an imaging part is such an two-dimensional coordinate plane and is arranged at a lower limit position of the transparent screen in a case where the obstacle is detected in an image that is imaged by using such an imaging part installed in the vehicle, and a second calculation process for calculating a position of an end point of an indication line on the transparent screen in such a manner that such an indication line is viewed while the position calculated in the first calculation process is an origin and the obstacle is present at the end point in a direction thereof, wherein the alert image is produced by arranging the first icon and the indication line depending on calculation results in the first and second calculation processes.

Illustrative Embodiment (12) is a program is characterized by causing a computer in an information processing device for producing an alert image that is displayed on a transparent screen that is viewed by a driver for a vehicle to execute a first calculation process for calculating a position of a first icon on the transparent screen in such a manner that such a first icon for indicating that an obstacle is detected is viewed at a position of the obstacle on a two-dimensional coordinate plane in a case where an imaging area for an imaging part is such an two-dimensional coordinate plane and is arranged at a lower limit position of the transparent screen in a case where the obstacle is detected in an image that is imaged by using such an imaging part installed in the vehicle, and a second calculation process for calculating a position of an end point of an indication line on the transparent screen in such a manner that such an indication line is viewed while the position calculated in the first calculation process is an origin and the obstacle is present at the end point in a direction thereof, wherein the alert image is produced by arranging the first icon and the indication line depending on calculation results in the first and second calculation processes.

According to each illustrative embodiment of the present invention, it may be possible to provide, on a head-up display device, a display suitable for taking avoidance behavior against an obstacle by a driver.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2014-006625 filed on Jan. 17, 2014, the entire content(s) of which is/are herein incorporated by reference.

What is claimed is:
1. An information processing device, comprising:
a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part;
a second calculation part configured to calculate a position of an end point of an indication line on the transparent screen, the indication line being viewed as extending from a position of the first icon on the transparent screen toward the obstacle, and
a determination part configured to determine whether or not a position of the obstacle is present in an area of the transparent screen, an image of the obstacle being viewed at a position of the first icon on the transparent screen in a case where a position of the obstacle is not present in the transparent screen.

2. The information processing device as claimed in claim 1, further comprising:
a third calculation part configured to calculate a position of a second icon on the transparent screen in a case where a position of the obstacle is present in an area of the transparent screen, the second icon emphasizing the obstacle, the second icon being viewed at a position of the obstacle.

3. The information processing device as claimed in claim 2, wherein the third calculation part is configured to calculate a straight line passing through a position of the obstacle and a position of an eye ball of the driver and calculate a position of a point of intersection between a position of the straight line and the transparent screen as a position of the second icon on the transparent screen.

4. The information processing device as claimed in claim 1, wherein the second calculation part is configured to calculate a straight line passing through a position of the obstacle and a position of an eye ball of the driver and calculate a position of a point of intersection between the straight line and the transparent screen as a position of an end point of the indication line on the transparent screen.

5. The information processing device as claimed in claim 1, wherein the first icon or an image of the obstacle is viewed as being changed depending on a running speed of the vehicle.

6. An information processing device, comprising:
a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part;
a second calculation part configured to calculate a position of an end point of an indication line on the transparent screen, the indication line being viewed as extending from a position of the first icon on the transparent screen toward the obstacle; and
a fourth calculation part configured to calculate a perimeter line of the two-dimensional coordinate plane, the perimeter line being viewed,
wherein the fourth calculation part is configured to change a perimeter line of the two-dimensional coordinate plane in a direction perpendicular to the transparent screen depending on a running speed of the vehicle.

7. An information processing device, comprising:
a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part; and
a second calculation part configured to calculate a position of an end point of an indication line on the transparent screen, the indication line being viewed as extending from a position of the first icon on the transparent screen toward the obstacle,
wherein the first calculation part is configured to calculate a straight line passing through a position of the obstacle in the two-dimensional coordinate plane and a position of an eye ball of the driver and calculate a position of a point of intersection between a position of the straight line and the transparent screen as a position of the first icon on the transparent screen.

8. An information processing device, comprising:
a first calculation part configured to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part; and
a second calculation part configured to calculate a position of an end point of an indication line on the transparent screen, the indication line being viewed as extending from a position of the first icon on the transparent screen toward the obstacle, wherein the second calculation part is configured to calculate a first straight line passing through a position of the obstacle and a position of an eye ball of the driver and calculate, as a position of an end point of the indication line on the transparent screen, a position where a straight line passing through a position of a point of intersection between the first straight line and a plane identical to the transparent screen and a position of a point of intersection between a second straight line passing through a position of the obstacle on the two-dimensional coordinate plane and a position of an eye ball of the driver and the transparent screen intersects with a perimeter of the transparent screen.

9. An information processing method, comprising:
a first calculation step to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part;

a second calculation step to calculate a position of an end point of an indication line on the transparent screen, the indication line being viewed as extending from a position of the first icon on the transparent screen toward the obstacle, and a determination step to determine whether or not a position of the obstacle is present in an area of the transparent screen, an image of the obstacle being viewed at a position of the first icon on the transparent screen in a case where a position of the obstacle is not present in the transparent screen.

10. A non-transitory computer-readable recording medium storing therein a program configured to cause a computer to execute:

a first calculation step to calculate a position of a first icon on a transparent screen, the transparent screen being viewed by a driver of a vehicle, the first icon indicating that an obstacle in a path of a vehicle is detected from an image captured by an imaging part provided in the vehicle, the first icon being viewed at a position of the obstacle on a two-dimensional coordinate plane arranged at a lower limit position of the transparent screen, the two-dimensional coordinate plane corresponding to an imaging area of the imaging part; and a second calculation step to calculate a position of an end point of an indication line on the transparent screen, the indication line being viewed as extending from a position of the first icon on the transparent screen toward the obstacle, and a determination step to determine whether or not a position of the obstacle is present in an area of the transparent screen, an image of the obstacle being viewed at a position of the first icon on the transparent screen in a case where a position of the obstacle is not present in the transparent screen.

* * * * *